(12) United States Patent
Sun et al.

(10) Patent No.: US 10,721,723 B2
(45) Date of Patent: Jul. 21, 2020

(54) DYNAMIC PADDING FIELD TO MATCH DOWNLINK AND UPLINK DOWNLINK CONTROL INFORMATION LENGTH

(71) Applicant: QUALCOMM Incorporated, San Diego, CA (US)

(72) Inventors: Jing Sun, San Diego, CA (US); Piyush Gupta, Bridgewater, NJ (US); Wanshi Chen, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/014,988

(22) Filed: Jun. 21, 2018

(65) Prior Publication Data

US 2018/0376463 A1    Dec. 27, 2018

Related U.S. Application Data

(60) Provisional application No. 62/524,355, filed on Jun. 23, 2017.

(51) Int. Cl.
*H04W 4/00* (2018.01)
*H04W 72/04* (2009.01)
*H04L 5/00* (2006.01)
*H04L 1/00* (2006.01)
*H04W 72/14* (2009.01)
*H04W 72/12* (2009.01)

(52) U.S. Cl.
CPC ......... *H04W 72/042* (2013.01); *H04L 1/0061* (2013.01); *H04L 5/0053* (2013.01); *H04W 72/1289* (2013.01); *H04W 72/14* (2013.01); *H04L 5/001* (2013.01); *H04L 5/0092* (2013.01)

(58) Field of Classification Search
None
See application file for complete search history.

(56) References Cited

U.S. PATENT DOCUMENTS

| 2011/0219010 A1* | 9/2011 | Lim | G06F 16/00 707/747 |
| 2012/0182950 A1* | 7/2012 | Chung | H04L 5/0053 370/329 |
| 2015/0092694 A1* | 4/2015 | You | H04W 4/70 370/329 |

OTHER PUBLICATIONS

International Search Report and Written Opinion—PCT/US2018/039124—ISA/EPO—dated Oct. 4, 2018.

* cited by examiner

*Primary Examiner* — Clemence S Han
(74) *Attorney, Agent, or Firm* — Qualcomm Incorporated

(57) ABSTRACT

Aspects of the disclosure relate to communication systems, apparatus and methods which enable or support transmitting/receiving downlink control information (DCI) carrying a downlink grant or an uplink grant. A method includes detecting a reference length based on an effective length of a downlink (DL) grant DCI and an effective length of an uplink (UL) grant DCI and calculating a length difference based on the effective DL grant DCI length and the effective UL grant DCI length. A length of a padding field in the DL grant DCI and/or the UL grant DCI is set equal to the calculated length difference such that the lengths of the DL grant DCI and UL grant DCI are both equal to the reference length. Padding bits are inserted in the padding field of the DL grant DCI and/or the UL grant DCI. Thereafter, the DL grant DCI and/or the UL grant DCI is encoded and transmitted to a scheduled entity.

60 Claims, 12 Drawing Sheets

Self-Contained Slots

DYNAMIC PADDING FIELD TO MATCH DOWNLINK AND UPLINK DOWNLINK CONTROL INFORMATION LENGTH

CROSS-REFERENCE TO RELATED APPLICATIONS

This application claims priority to and the benefit of U.S. Provisional Application Ser. No. 62/524,355, entitled "DYNAMIC PADDING FIELD TO MATCH DOWNLINK AND UPLINK DOWNLINK CONTROL INFORMATION LENGTH" filed on Jun. 23, 2017, the entire contents of which is incorporated herein by reference.

TECHNICAL FIELD

The technology discussed below relates generally to wireless communication systems, and more particularly, to transmissions of downlink control information (DCI). Embodiments can provide and enable techniques for transmitting/decoding DCI carrying a downlink grant or an uplink grant.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

Wireless communication networks are being utilized to provide and support an even broader range of services for various types of devices with different capabilities. While some devices can operate within the available bandwidth of the communication channels, requirements for uplink control channels in devices employing NR access technologies may be unmet or unattainable in conventional network implementations.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for transmitting downlink control information (DCI) carrying a downlink grant or an uplink grant is disclosed. The method includes detecting a reference length based on an effective length of a downlink (DL) grant DCI and an effective length of an uplink (UL) grant DCI, calculating a length difference based on the effective DL grant DCI length and the effective UL grant DCI length, setting a length of a padding field in at least one of the DL grant DCI or the UL grant DCI equal to the calculated length difference such that the lengths of the DL grant DCI and UL grant DCI are both equal to the reference length, inserting padding bits in the padding field of the at least one of the DL grant DCI or the UL grant DCI, encoding the at least one of the DL grant DCI or the UL grant DCI, and transmitting at least one of the encoded DL grant DCI or the encoded UL grant DCI to a scheduled entity. The method may further include transmitting a configuration to the scheduled entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

In some examples, the detecting the reference length includes detecting a maximum length of the effective DL grant DCI length and the effective UL grant DCI length, the calculating the length difference includes calculating a difference between the effective DL grant DCI length and the effective UL grant DCI length, the setting the length of the padding field includes setting the length of the padding field in a shorter one of the DL grant DCI and the UL grant DCI equal to the calculated difference such that the shorter one of the DL grant DCI and the UL grant DCI is lengthened to match the detected maximum length, and the padding bits are inserted in the padding field of the shorter one of the DL grant DCI and the UL grant DCI that is lengthened to match the detected maximum length.

In other examples, the detecting the reference length includes configuring a common total length that is no shorter than both the effective DL grant DCI length and the effective UL grant DCI length, the calculating the length difference includes calculating a difference between the configured common total length and the effective DL grant DCI length and a difference between the configured common total length and the effective UL grant DCI length, the setting the length of the padding field includes setting the length of the padding field in the DL grant DCI equal to the calculated difference between the configured common total length and the effective DL grant DCI length such that the length of the DL grant DCI is lengthened to match the configured common total length, and setting the length of the padding field in the UL grant DCI equal to the calculated difference between the configured common total length and the effective UL grant DCI length such that the length of the UL grant DCI is lengthened to match the configured common total length, and the padding bits are inserted in the padding field of the DL grant DCI that is lengthened to match the configured common total length and inserted in the padding field of the UL grant DCI that is lengthened to match the configured common total length.

In one example, the padding bits inserted in the padding field are values of zero used for error detection. In another example, the padding bits inserted in the padding field are values for a cyclic redundancy check (CRC). The CRC may be a single CRC generation having a fixed length. Alternatively, the CRC may be one of a plurality of CRC generations having different lengths that corresponds to the length of the padding field.

In another example, an apparatus for transmitting downlink control information (DCI) carrying a downlink grant or an uplink grant, includes means for detecting a reference length based on an effective length of a downlink (DL) grant DCI and an effective length of an uplink (UL) grant DCI, means for calculating a length difference based on the effective DL grant DCI length and the effective UL grant DCI length, means for setting a length of a padding field in at least one of the DL grant DCI or the UL grant DCI equal to the calculated length difference such that the lengths of the DL grant DCI and UL grant DCI are both equal to the reference length, means for inserting padding bits in the padding field of the at least one of the DL grant DCI or the UL grant DCI, means for encoding the at least one of the DL grant DCI or the UL grant DCI, and means for transmitting at least one of the encoded DL grant DCI or the encoded UL grant DCI to a scheduled entity. The apparatus may further include means for transmitting a configuration to the scheduled entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

In another example, a computer-readable medium stores computer-executable code for transmitting downlink control information (DCI) carrying a downlink grant or an uplink grant. The code may cause a computer to detect a reference length based on an effective length of a downlink (DL) grant DCI and an effective length of an uplink (UL) grant DCI, calculate a length difference based on the effective DL grant DCI length and the effective UL grant DCI length, set a length of a padding field in at least one of the DL grant DCI or the UL grant DCI equal to the calculated length difference such that the lengths of the DL grant DCI and UL grant DCI are both equal to the reference length, insert padding bits in the padding field of the at least one of the DL grant DCI or the UL grant DCI, encode the at least one of the DL grant DCI or the UL grant DCI, and transmit at least one of the encoded DL grant DCI or the encoded UL grant DCI to a scheduled entity. The code may further cause the computer to transmit a configuration to the scheduled entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

In another example, an apparatus for transmitting downlink control information (DCI) carrying a downlink grant or an uplink grant has a processor, a transceiver communicatively coupled to the processor, and a memory communicatively coupled to the processor. The processor may be configured to detect a reference length based on an effective length of a downlink (DL) grant DCI and an effective length of an uplink (UL) grant DCI, calculate a length difference based on the effective DL grant DCI length and the effective UL grant DCI length, set a length of a padding field in at least one of the DL grant DCI or the UL grant DCI equal to the calculated length difference such that the lengths of the DL grant DCI and UL grant DCI are both equal to the reference length, insert padding bits in the padding field of the at least one of the DL grant DCI or the UL grant DCI, encode the at least one of the DL grant DCI or the UL grant DCI, and transmit at least one of the encoded DL grant DCI or the encoded UL grant DCI to a scheduled entity. The processor may further be configured to transmit a configuration to the scheduled entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

In another example, a method for decoding grant downlink control information (DCI) carrying a downlink grant or an uplink grant is disclosed. The method includes receiving the grant DCI from a scheduling entity, detecting a reference length of the grant DCI based on an effective length of a downlink (DL) grant DCI and an effective length of an uplink (UL) grant DCI, reading a payload of the grant DCI based on the reference length to determine an identity of the grant DCI as the DL grant DCI or the UL grant DCI, detecting if the grant DCI includes a padding field based on the identity of the grant DCI and the effective DL grant DCI length or the effective UL grant DCI length, calculating a length of the padding field if the grant DCI includes the padding field, and decoding padding bits in the padding field according to the calculated padding field length to decode the grant DCI. The method may further include receiving a configuration from the scheduling entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

In some examples, the calculating the length of the padding field includes calculating a length difference based on the effective DL grant DCI length and the effective UL grant DCI length and calculating the length of the padding field in the grant DCI to be equal to the calculated length difference such that the length of the grant DCI is equal to the reference length.

In some examples, the detecting the reference length includes detecting a maximum length of the effective DL grant DCI length and the effective UL grant DCI length, and the calculating the length difference includes calculating a difference between the effective DL grant DCI length and the effective UL grant DCI length. Accordingly, the detecting if the grant DCI includes the padding field includes comparing the maximum length to the effective DL grant DCI length when the identity of the grant DCI is the DL grant DCI and detecting that the grant DCI includes the padding field when the effective DL grant DCI length does not match the maximum length, and comparing the maximum length to the effective UL grant DCI length when the identity of the grant DCI is the UL grant DCI and detecting that the grant DCI includes the padding field when the effective UL grant DCI length does not match the maximum length.

In other examples, the detecting the reference length includes configuring a common total length that is no shorter than both the effective DL grant DCI length and the effective UL grant DCI length, and the calculating the length difference includes calculating a difference between the configured common total length and the effective DL grant DCI length and a difference between the configured common total length and the effective UL grant DCI length. Accordingly, the detecting if the grant DCI includes the padding field includes comparing the common total length to the effective DL grant DCI length when the identity of the grant DCI is the DL grant DCI and detecting that the grant DCI includes the padding field when the effective DL grant DCI length does not match the common total length, and comparing the common total length to the effective UL grant DCI length when the identity of the grant DCI is the UL grant DCI and detecting that the grant DCI includes the padding field when the effective UL grant DCI length does not match the common total length.

In one example, the decoded padding bits are values of zero used for error detection. In another example, the decoded padding bits are values for a cyclic redundancy check (CRC). The CRC may be a single CRC generation having a fixed length. Alternatively, the CRC may be one of a plurality of CRC generations having different lengths that corresponds to the length of the padding field.

In another example, an apparatus for decoding grant downlink control information (DCI) carrying a downlink grant or an uplink grant, includes means for receiving the grant DCI from a scheduling entity, means for detecting a reference length of the grant DCI based on an effective length of a downlink (DL) grant DCI and an effective length of an uplink (UL) grant DCI, means for reading a payload of the grant DCI based on the reference length to determine an identity of the grant DCI as the DL grant DCI or the UL grant DCI, means for detecting if the grant DCI includes a padding field based on the identity of the grant DCI and the effective DL grant DCI length or the effective UL grant DCI length, means for calculating a length of the padding field if the grant DCI includes the padding field, and means for decoding padding bits in the padding field according to the calculated padding field length to decode the grant DCI. The apparatus may further include means for receiving a configuration from the scheduling entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

In another example, a computer-readable medium stores computer-executable code for decoding grant downlink control information (DCI) carrying a downlink grant or an uplink grant. The code may cause a computer to receive the grant DCI from a scheduling entity, detect a reference length of the grant DCI based on an effective length of a downlink (DL) grant DCI and an effective length of an uplink (UL) grant DCI, read a payload of the grant DCI based on the reference length to determine an identity of the grant DCI as the DL grant DCI or the UL grant DCI, detect if the grant DCI includes a padding field based on the identity of the grant DCI and the effective DL grant DCI length or the effective UL grant DCI length, calculate a length of the padding field if the grant DCI includes the padding field, and decode padding bits in the padding field according to the calculated padding field length to decode the grant DCI. The code may further cause the computer to receive a configuration from the scheduling entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

In another example, an apparatus for decoding grant downlink control information (DCI) carrying a downlink grant or an uplink grant has a processor, a transceiver communicatively coupled to the processor, and a memory communicatively coupled to the processor. The processor may be configured to receive the grant DCI from a scheduling entity, detect a reference length of the grant DCI based on an effective length of a downlink (DL) grant DCI and an effective length of an uplink (UL) grant DCI, read a payload of the grant DCI based on the reference length to determine an identity of the grant DCI as the DL grant DCI or the UL grant DCI, detect if the grant DCI includes a padding field based on the identity of the grant DCI and the effective DL grant DCI length or the effective UL grant DCI length, calculate a length of the padding field if the grant DCI includes the padding field, and decode padding bits in the padding field according to the calculated padding field length to decode the grant DCI. The processor may further be configured to receive a configuration from the scheduling entity, wherein the configuration includes a DL grant DCI format indicating the effective DL grant DCI length, a UL grant DCI format indicating the effective UL grant DCI length, and/or a common total length that is no shorter than both the effective DL grant DCI length and the effective UL grant DCI length.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure relate to communication systems, apparatus and methods which enable or support transmitting/receiving downlink control information (DCI) carrying a downlink grant or an uplink grant. In one example, a method for transmitting downlink control information (DCI) carrying a downlink grant or an uplink grant includes detecting a reference length based on an effective length of a downlink (DL) grant DCI and an effective length of an uplink (UL) grant DCI and calculating a length difference based on the effective DL grant DCI length and the effective UL grant DCI length. A length of a padding field in the DL grant DCI and/or the UL grant DCI is set equal to the calculated length difference such that the lengths of the DL grant DCI and UL grant DCI are both equal to the reference length. Padding bits are inserted in the padding field of the DL grant DCI and/or the UL grant DCI. Thereafter, the DL grant DCI and/or the UL grant DCI is encoded and transmitted to a scheduled entity.

In another example, a method for decoding downlink control information (DCI) carrying a downlink grant or an uplink grant includes receiving the grant DCI from a scheduling entity, detecting a reference length of the grant DCI based on an effective length of a downlink (DL) grant DCI and an effective length of an uplink (UL) grant DCI, and reading a payload of the grant DCI based on the reference length to determine an identity of the grant DCI as the DL grant DCI or the UL grant DCI. The method further includes detecting if the grant DCI includes a padding field based on the identity of the grant DCI and the effective DL grant DCI length or the effective UL grant DCI length, calculating a length of the padding field if the grant DCI includes the padding field, and decoding padding bits in the padding field according to the calculated padding field length to decode the grant DCI.

Figure 1:
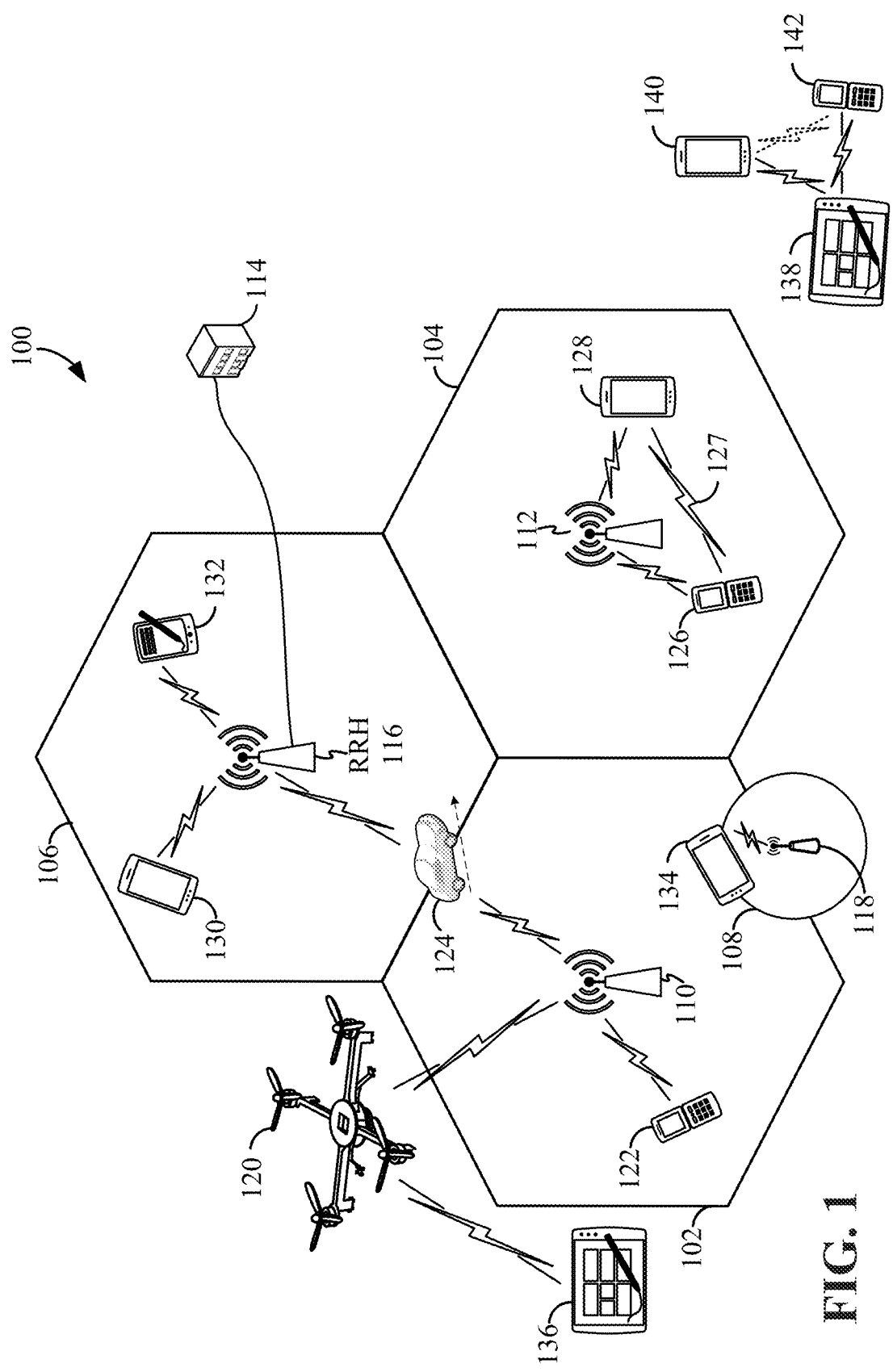
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quad-copter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
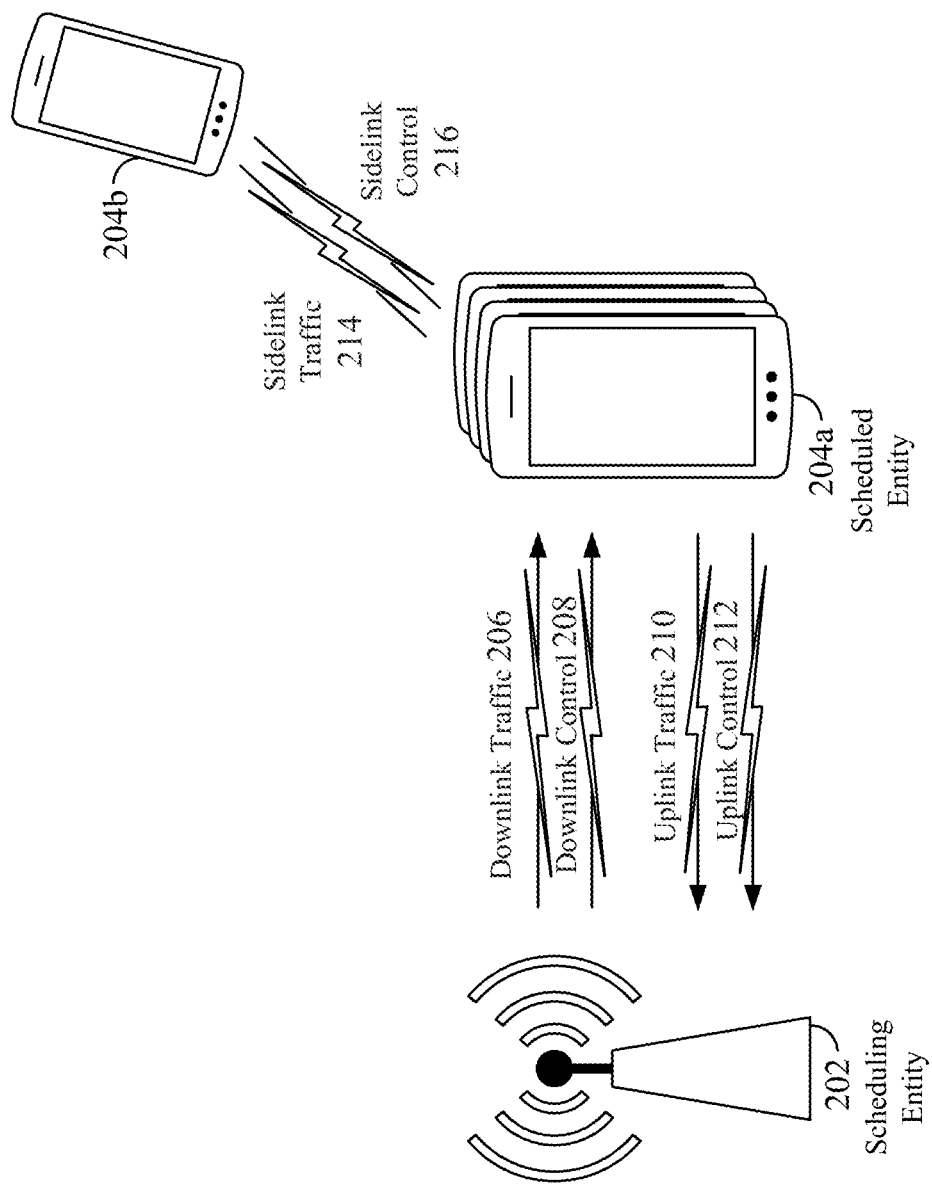
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
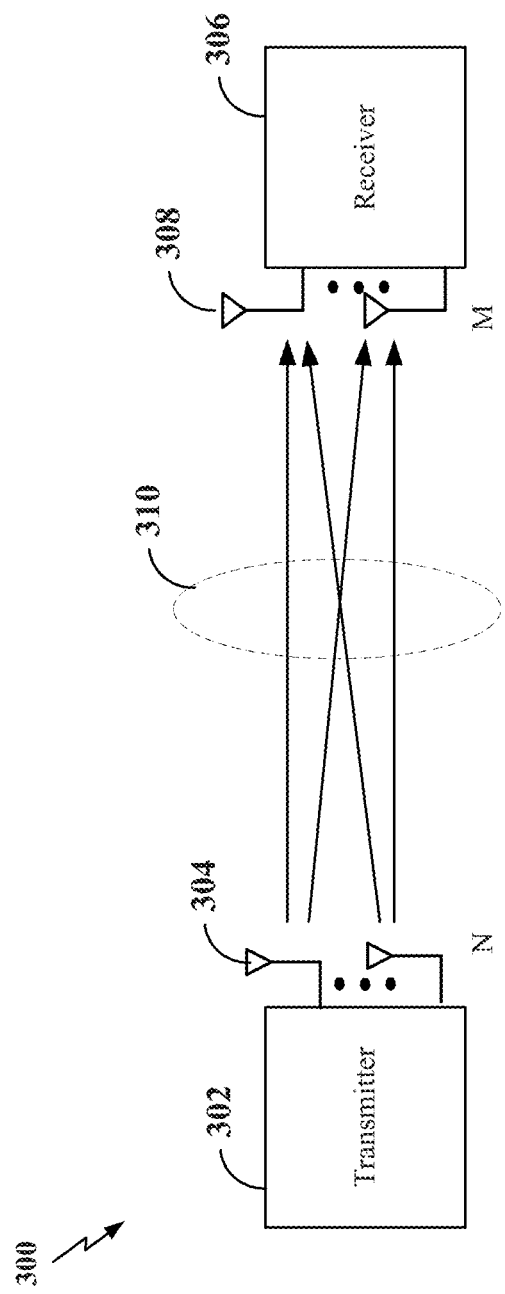
FIG. 3 illustrates an example of a wireless communication system supporting MIMO.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 202, a scheduled entity 204, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Transmissions over the radio access network 100 may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, Turbo codes, low-density parity check (LDPC) codes, and Polar codes. Various implementations of scheduling entities 202 and scheduled entities 204 may include suitable hardware and capabilities (e.g., an encoder, a decoder, and/or a CODEC) to utilize any one or more of these error correcting codes for wireless communication.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
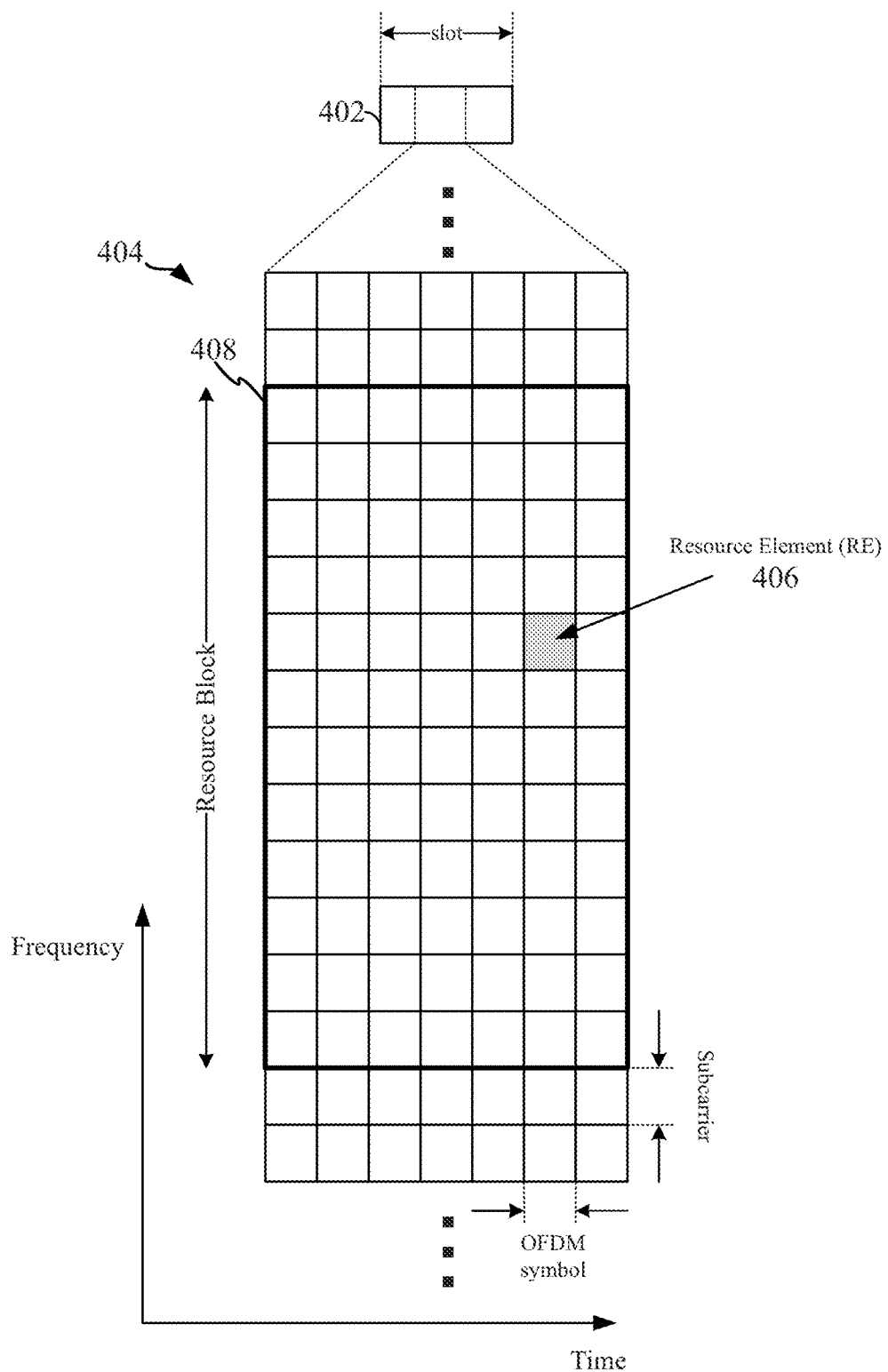
FIG. 4 illustrates an OFDM waveform.

Various aspects of the present disclosure will be described with reference to an OFDM waveform, as illustrated in FIG. 4. That is, in a 5G NR radio access network, it is anticipated that OFDM may be utilized for DL transmissions, UL transmissions (OFDMA), and/or sidelink transmissions. Accordingly, it should be understood that various aspects of the present disclosure may be applied to any of these links when utilizing OFDM. Furthermore, in a 5G NR radio access network, a waveform other than OFDM may be utilized for UL and/or sidelink transmissions, such as SC-FDMA. It should be further understood that various aspects of the present disclosure may be applied to an SC-FDMA waveform in substantially the same way as described herein below. That is, while some examples of the present disclosure may focus on a DL OFDM link for clarity, it should be understood that the same principles may be applied to DL, UL, and sidelink, utilizing OFDM as well as SC-FDMA waveforms.

Referring now to FIG. 4, an exemplary DL slot 402 in an OFDM air interface is illustrated. However, as those skilled in the art will readily appreciate, the slot structure for any particular application may vary from the example described here, depending on any number of factors. In this example, a portion of a time slot (slot) 402 is expanded to illustrate a resource grid 404, expanded in time and frequency dimensions. Here, time is in the horizontal direction with units of OFDM symbols; and frequency is in the vertical direction with units of subcarriers.

That is, a resource grid 404 may be used to schematically represent time-frequency resources. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. An RB may be the smallest unit of resources that can be allocated to a UE. Thus, the more RBs scheduled for a UE, and the higher the modulation scheme chosen for the air interface, the higher the data rate for the UE. In this illustration, the RB 408 is shown as occupying less than the entire bandwidth of the slot 402, with some subcarriers illustrated above and below the RB 408. In a given implementation, the slot 402 may have a bandwidth corresponding to any number of one or more RBs 408. Further, in this illustration, the RB 408 is shown as occupying less than the entire duration of the slot 402, although this is merely one possible example.

A slot might contain all DL, all UL, or at least one DL portion and at least one UL portion. Within the present disclosure, it is assumed that a single RB such as the RB 408 entirely corresponds to a single direction of communication (either transmission or reception for a given device).

Although not illustrated in FIG. 4, the various REs 406 within the RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device 302 (e.g., the scheduling entity 202) may allocate one or more REs 406 within the RB 408 to carry DL control information 208 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device 302 (e.g., the scheduled entity 204) may utilize one or more REs 406 within the RB 408 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, the RB 408 may include one or more REs 406 allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within a data region may be configured to carry system information blocks (SIBs), carrying information that may enable access to a given cell.

The channels or carriers described above and illustrated in FIG. 2 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support from 15 kHz to 480 kHz SCS.

Figure 5:
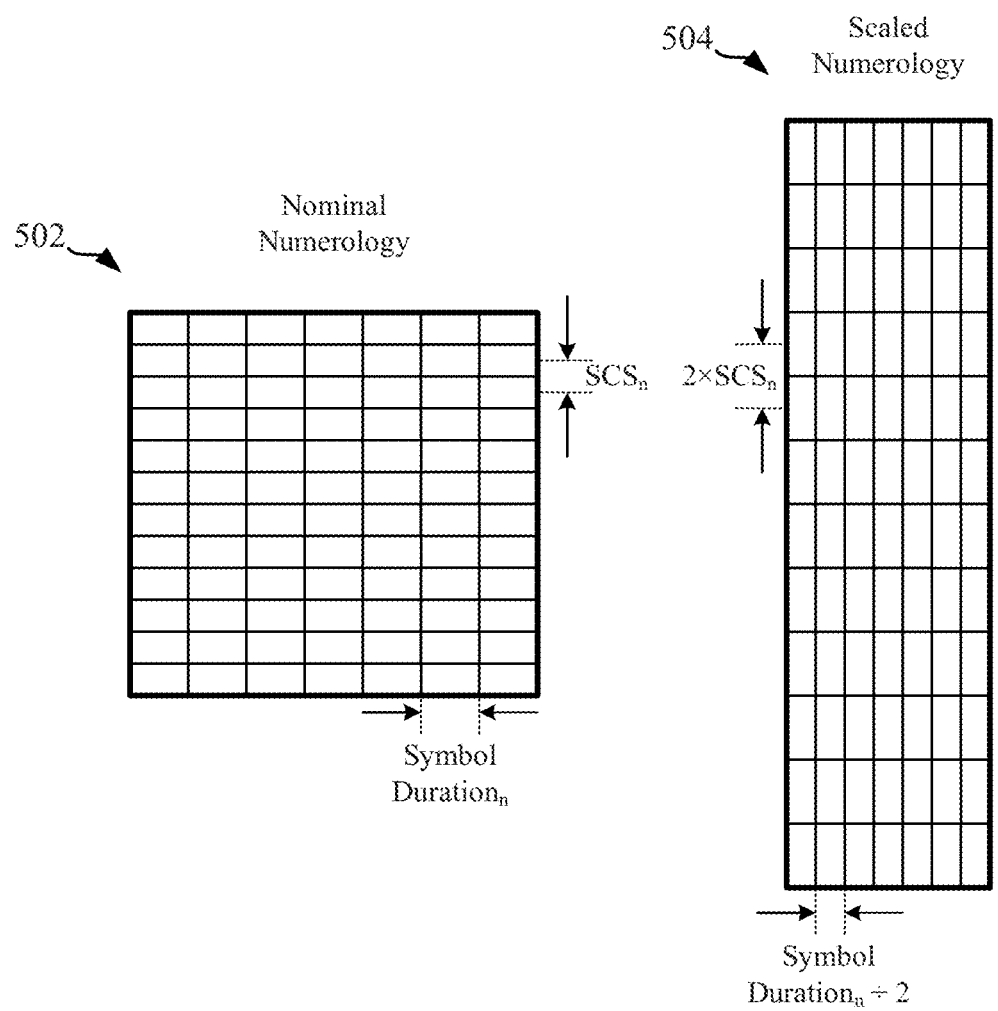
FIG. 5 illustrates resource blocks having nominal and scaled numerologies.

To illustrate this concept of a scalable numerology, FIG. 5 shows a first RB 502 having a nominal numerology, and a second RB 504 having a scaled numerology. As one example, the first RB 502 may have a 'nominal' subcarrier spacing ($SCS_n$) of 30 kHz, and a 'nominal' symbol $duration_n$ of 333 µs. Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol $duration_n$)÷2=167 µs.

As discussed above, wireless communications in the radio access network 100 may be organized in terms of slots. In some examples, a slot may be defined according to a specified number of OFDM symbols having the same subcarrier spacing, and with a given cyclic prefix (CP) length. For example, a slot may include 7 or 14 OFDM symbols for the same subcarrier spacing with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

Figure 6:
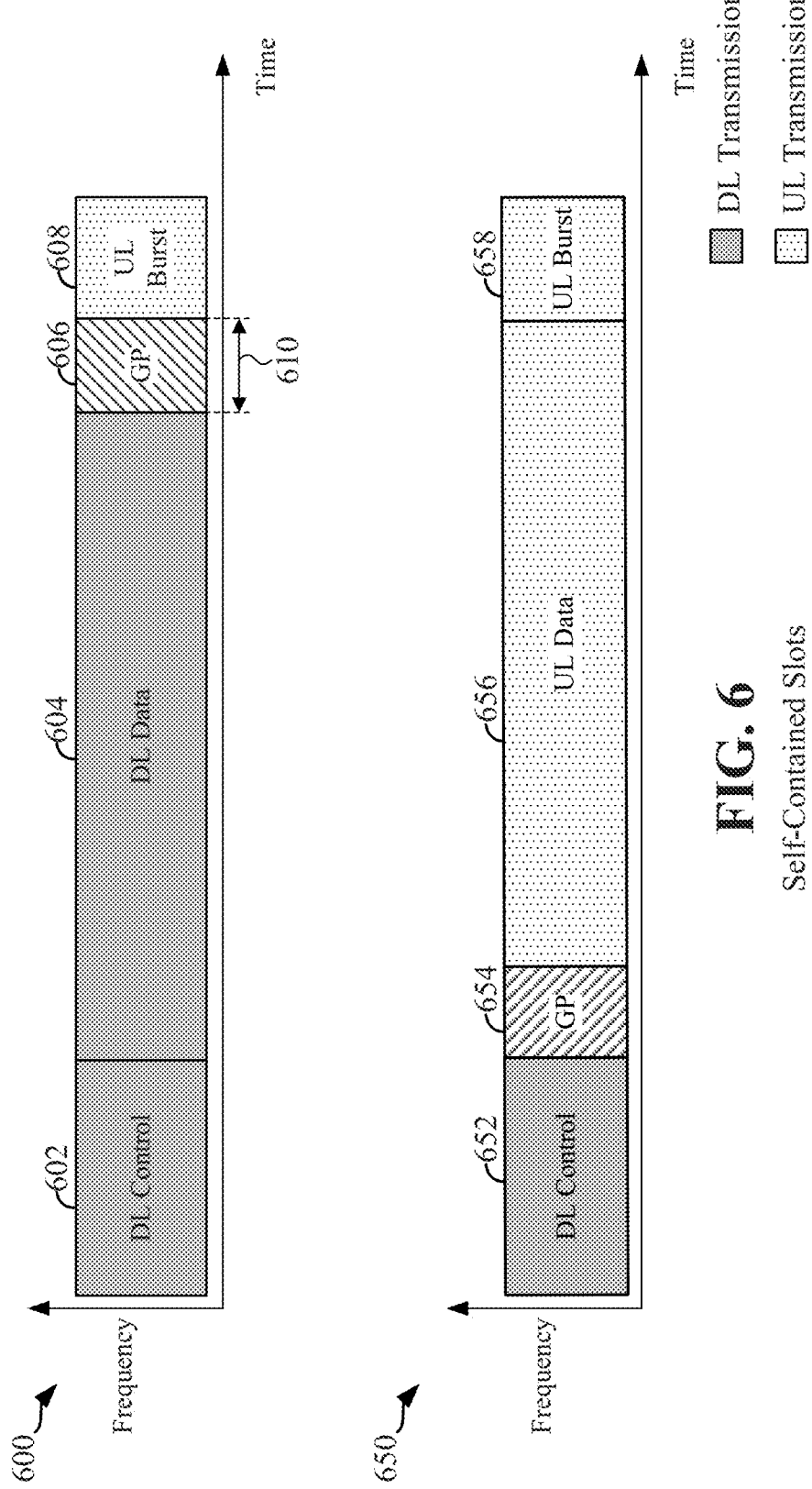
FIG. 6 illustrates example structures of self-contained slots.

According to an aspect of the disclosure, one or more slots may be structured as self-contained slots. For example, FIG. 6 illustrates two example structures of self-contained slots 600 and 650. Here, the slots 600 and 650 may correspond to the slot 402 described above and illustrated in FIG. 4.

In the illustrated example, a DL-centric slot 600 may be a transmitter-scheduled slot. The nomenclature DL-centric generally refers to a structure wherein more resources are allocated for transmissions in the DL direction (e.g., transmissions from the scheduling entity 202 to the scheduled entity 204). Similarly, an UL-centric slot 650 may be a receiver-scheduled slot, wherein more resources are allocated for transmissions in the UL direction (e.g., transmissions from the scheduled entity 204 to the scheduling entity 202).

Each slot, such as the DL-centric slots 600 and 650, may include transmit (Tx) and receive (Rx) portions. For example, in the DL-centric slot 600, the scheduling entity 202 first has an opportunity to transmit control information, e.g., on a PDCCH, in a DL control region 602, and then an opportunity to transmit DL user data or traffic, e.g., on a PDSCH in a DL data region 604. Following a guard period (GP) region 606 having a suitable duration 610, the scheduling entity 202 has an opportunity to receive UL data and/or UL feedback including any UL scheduling requests, CSF, a HARQ ACK/NACK, etc., in an UL burst 608 from other entities using the carrier. Here, a slot such as the DL-centric slot 600 may be referred to as a self-contained slot when all of the data carried in the data region 604 is scheduled in the control region 602 of the same slot; and further, when all of the data carried in the data region 604 is acknowledged (or at least has an opportunity to be acknowledged) in the UL burst 608 of the same slot. In this way, each self-contained slot may be considered a self-contained entity, not necessarily requiring any other slot to complete a scheduling-transmission-acknowledgment cycle for any given packet.

The GP region 606 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 202. Accordingly, the GP region 606 may allow an amount of time after the DL data region 604 to prevent interference, where the GP region 606 provides an appropriate amount of time for the scheduling entity 202 to switch its RF antenna direction, an appropriate amount of time for the over-the-air (OTA) transmission, and an appropriate amount of time for ACK processing by the scheduled entity.

Similarly, the UL-centric slot 650 may be configured as a self-contained slot. The UL-centric slot 650 is substantially similar to the DL-centric slot 600, including a guard period 654, an UL data region 656, and an UL burst region 658.

The slot structure illustrated in slots 600 and 650 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Figure 7:
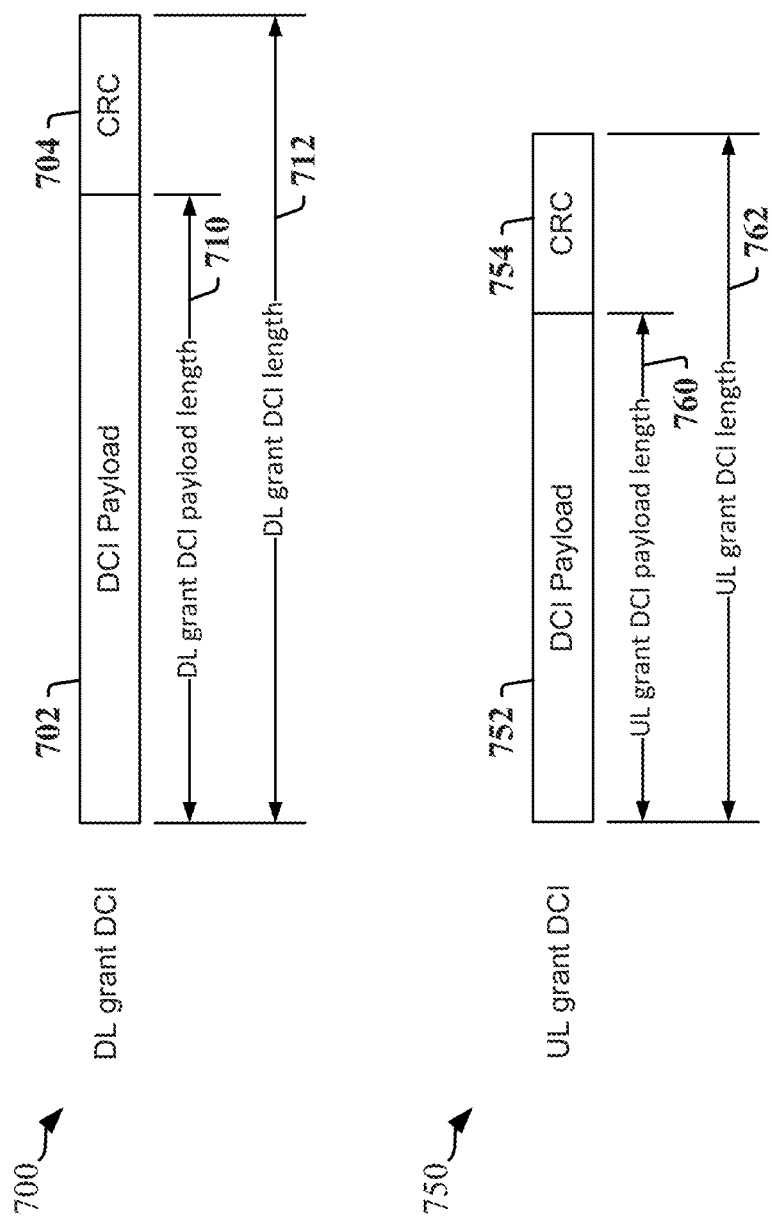
FIG. 7 illustrates example formats of downlink (DL) grant downlink control information (DCI) and uplink (UL) grant DCI.

FIG. 7 illustrates example formats of downlink (DL) grant downlink control information (DCI) 700 and uplink (UL) grant DCI 750. The DL grant DCI 700 may include a DCI payload field 702 and a CRC field 704. Moreover, the DL grant DCI 700 may have a DL grant DCI payload length 710 and a DL grant DCI length 712. Similarly, the UL grant DCI 750 may include a DCI payload field 752 and a CRC field 754. The UL grant DCI 750 may also have a UL grant DCI payload length 760 and a UL grant DCI length 762.

In a fourth generation (4G) Long Term Evolution (LTE) communications technology, the DL grant DCI length 712 is generally different from the uplink (UL) grant DCI length 762. Thus, for each decoding candidate, a UE may need to attempt two different length decodings (assuming a DL length and a UL length) to check if a decoding candidate is a valid grant. This may lead to more blind decodings, thus increasing complexity, power consumption, processing delay, etc.

In 5G NR, the DL grant DCI length 712 may be set to be equal to the UL grant DCI length 762 such that the UE can use single length decoding per decoding candidate. This helps to decrease complexity, power consumption, and/or processing delay, for example. In an aspect, a bit in a grant payload may indicate whether the grant is a DL grant or a UL grant to facilitate the UE's identification of the grant type. However, the DL grant and the UL grant may have different payload lengths, therefore, padding bits (e.g., zeros) may be used to equalize the total lengths of the DL and UL grants.

In 5G NR, both the DL and UL grants have numerous configurable features (e.g., different HARQ timing and different code block group (CBG) retransmission support). As a result, a DCI format may have a different length depending on the configuration, and thus, choosing a fixed padding size is generally difficult. Accordingly, what is needed is a technique that allows a length of a padding field in either the DL grant DCI or the UL grant DCI to dynamically change in accordance with the numerous DL and UL configurations while ensuring that the DL and UL grants have the same length.

Figure 8:
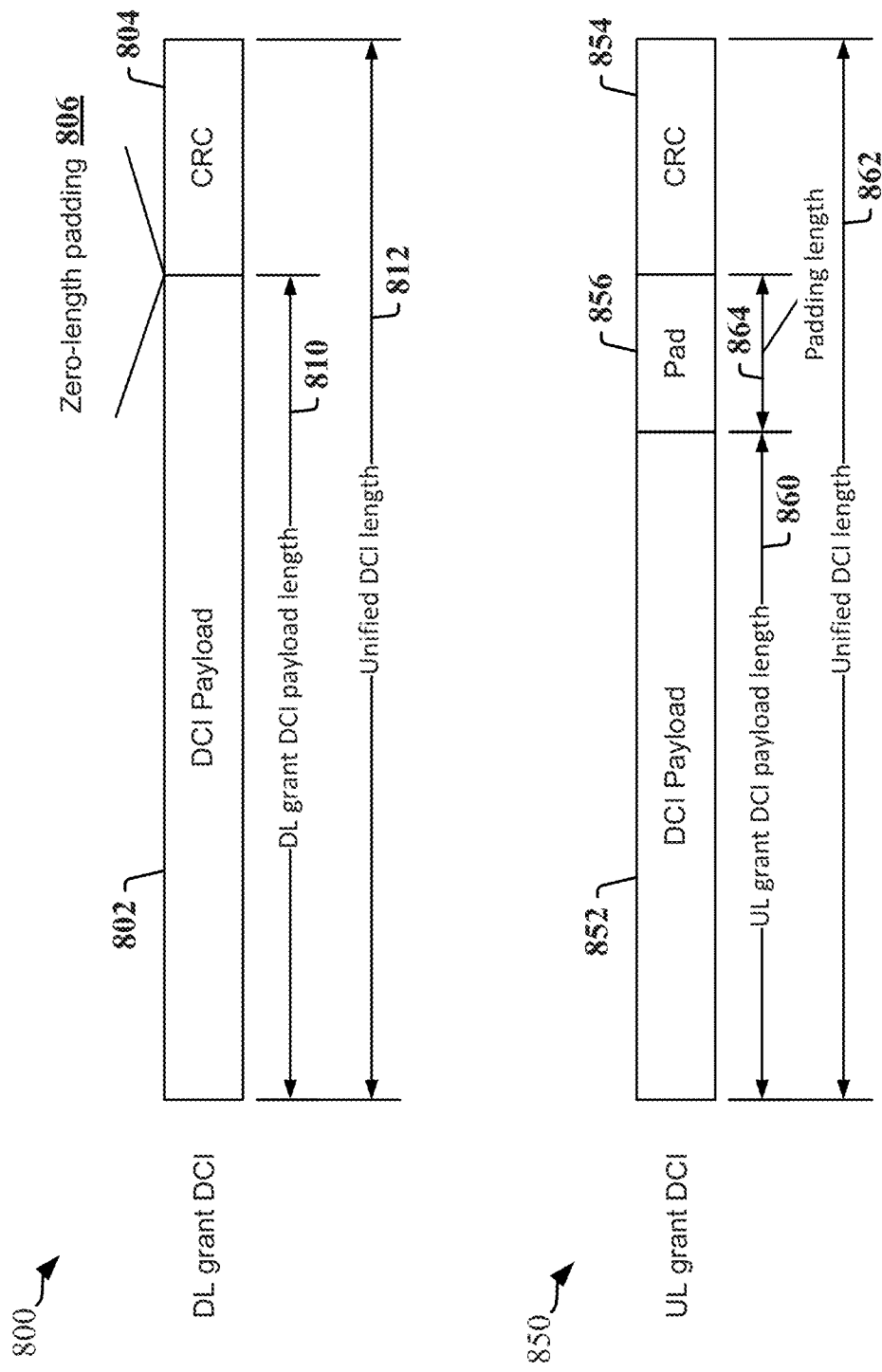
FIG. 8 illustrates example formats of downlink (DL) grant downlink control information (DCI) and uplink (UL) grant DCI including dynamic length padding fields.

FIG. 8 illustrates example formats of downlink (DL) grant downlink control information (DCI) 800 and uplink (UL) grant DCI 850 including dynamic length padding fields. The DL grant DCI 800 may include a DCI payload field 802, a CRC field (primary CRC) 804, and a dynamic length padding field 806 located between the DCI payload field 802 and the CRC field 804. The DL grant DCI 800 may have a DL grant DCI payload length 810 and a unified DCI length 812. Although the dynamic length padding field 806 is shown in FIG. 8 to have a zero length, it is contemplated that the dynamic padding field 806 may have any variable length.

Similarly, the UL grant DCI 850 may include a DCI payload field 852, a CRC field (primary CRC) 854, and a dynamic length padding field 856 located between the DCI payload field 852 and the CRC field 854. The UL grant DCI 850 may also have a UL grant DCI payload length 860 and a unified DCI length 862. Although the dynamic length padding field 856 is shown in FIG. 8 to have a padding length 864, it is contemplated that the dynamic length padding field 856 may have any variable length.

Referring to FIG. 8, according to certain aspects of the disclosure, a dynamic length padding field is defined in the DL grant DCI and/or the UL grant DCI instead of a fixed length padding field. An actual DCI length may be the maximum of an effective DL grant DCI length or an effective UL grant DCI length. A length of the dynamic length padding field may be equal to a gap between the effective DL grant DCI length and the effective UL grant DCI length. As a result, one of the DL grant DCI 800 or the UL grant DCI 850 will have a non-zero length dynamic length padding field. As shown in the example of FIG. 8, the UL grant DCI 850 includes the non-zero length dynamic length padding field 856 having the padding length 864.

In an example, if the DL grant DCI 800 has an effective length of 39 bits and the UL grant DCI has an effective length of 30 bits, then a gap of 9 bits exists between the effective DL grant DCI length and the effective UL grant DCI length. Accordingly, a dynamic length padding field 856 having a length of 9 bits may be inserted in the UL grant DCI 850 to match the length of the DL grant DCI 800. As a result, the DL grant DCI 800 and the UL grant DCI will both have a length of 39 bits.

In an aspect of the disclosure, if a gNB can naturally configure the length of the DL grant DCI to match the length of the UL grant DCI, there may be no need to insert the non-zero length dynamic length padding field in either the DL grant DCI or the UL grant DCI. That is, the length of the padding field will be zero for both the DL grant DCI and the UL grant DCI. For example, the gNB may accomplish this by configuring the length of UL CBG ACK/NACK bits (i.e., the number of UL CBGs) to be equal to the difference between the effective DL grant DCI length and the effective UL grant DCI length.

In an aspect of the disclosure, the gNB may configure a UE with respect to a format of the DL grant DCI and the UL grant DCI. The gNB is aware of the effective lengths of the DL grant DCI and the UL grant DCI. As such, the gNB may determine a maximum length of the effective DL grant DCI length and the effective UL grant DCI length as well as calculate a difference between the effective DL grant DCI length and the effective UL grant DCI length. The gNB may then set a length of a dynamic length padding field in the shorter one of the DL grant DCI and the UL grant DCI equal to the calculated difference, such that the shorter one of the DL grant DCI and UL grant DCI matches the determined maximum length.

Prior to transmitting either the DL grant DCI or the UL grant DCI to the UE, the gNB may first determine whether a grant DCI is to include a non-zero length dynamic length padding field (e.g., the shorter one of the DL grant DCI and the UL grant DCI). If the grant DCI is to include a zero length padding field (e.g., DL grant DCI 800), then the gNB may encode the grant DCI and transmit the encoded grant DCI to the UE. If the grant DCI is to include the non-zero length dynamic length padding field (e.g., UL grant DCI 850), then the gNB first inserts padding bits in the padding field of the grant DCI prior to encoding the grant DCI and transmitting the encoded grant DCI to the UE.

In an aspect of the disclosure, when the gNB configures the UE with respect to the format of the DL grant DCI and the UL grant DCI, the UE is made aware of the effective lengths of the DL grant DCI and the UL grant DCI. As such, the UE may determine a maximum length of the effective DL grant DCI length and the effective UL grant DCI length as well as calculate a difference between the effective DL grant DCI length and the effective UL grant DCI length. The UE may then determine that a length of a dynamic length padding field in the shorter one of the DL grant DCI and the UL grant DCI is equal to the calculated difference, such that the shorter one of the DL grant DCI and UL grant DCI matches the determined maximum length.

When decoding a decoding candidate, the UE may assume that a length of a grant DCI is the maximum length and perform a CRC accordingly. If the grant DCI passes the CRC, the UE may read a payload of the grant DCI to determine if the grant DCI is the DL grant DCI or the UL grant DCI. Upon knowing whether the grant DCI is the DL grant DCI or the UL grant DCI, the UE can determine whether the grant DCI includes a non-zero length dynamic length padding field since the UE is aware of the effective lengths of the DL grant DCI and the UL grant DCI. Accordingly, if the grant DCI includes the non-zero length dynamic length padding field, the UE will know the length of the padding field based on the previously calculated difference between the effective DL grant DCI length and the effective UL grant DCI length, and may remove/decode the dynamic padding bits accordingly.

In an aspect of the disclosure, the gNB may assign values of zero for the padding bits inserted into the padding field of the grant DCI. The zeros inserted into the padding field may be used as an additional error check. For example, when the UE decodes the grant DCI, if the decoding result does not return zero values for the padding field, then the UE may declare the decoding result as a false alarm. However, error detection capability based on inserting the padding field with zeros may be sub-optimum when the length of the padding field is long.

In an aspect of the disclosure, a secondary CRC may be inserted into the dynamic length padding field of the grant DCI. Thus, instead of using zero padding as described above, the dynamic length padding field may contain an additional CRC to have more uniform error detection capability.

For a grant DCI with a non-zero length dynamic length padding field, a transmitter side may pass a DCI payload through the secondary CRC. The secondary CRC function may be a generic CRC generation with a fixed length, which can be different from a normal CRC. An output of the secondary CRC may be punctured/repeated in order to fill an available space within the dynamic length padding field. Alternatively, the secondary CRC function may be a set of CRC generations with different CRC lengths. The choice of which CRC generation to use may depend on the length of the dynamic length padding field calculated (e.g., different padding field lengths map to different CRC generation choices). Rate matching may be used in addition to the secondary CRC. Accordingly, the DCI payload and the rate matched secondary CRC may be passed through a normal CRC generation to form a primary CRC (e.g., CRC 804 or CRC 854 of FIG. 8) of the grant DCI.

A receiver side may decode a decoding candidate assuming that a length of a grant DCI is the maximum length and perform a primary CRC (e.g., normal CRC) accordingly. If the grant DCI passes the primary CRC, the receiver side may identify the grant DCI type (DL grant DCI or UL grant DCI) via an indicator in the DCI payload. For the grant DCI with a non-zero length dynamic length padding field, the UE may run the DCI payload through the secondary CRC function to compare with the secondary CRC. If the DCI payload does not pass the secondary CRC, the UE may consider the decoding result a failure.

In an aspect of the disclosure, the error check operation described above of inserting zero values into the dynamic length padding field of the grant DCI may be used in combination with the error check operation of inserting a secondary CRC into the dynamic length padding field of the grant DCI. For example, if the length of the padding field is short, zero values may be inserted into the padding field. If the length of the padding field is long, the secondary CRC may be inserted into the padding field.

In an aspect of the disclosure, instead of the gNB determining a maximum length of the effective DL grant DCI length and the effective UL grant DCI length to calculate a length of a dynamic length padding field, the gNB may configure a common total length that is no shorter than both the effective DL grant DCI length and the effective UL grant DCI length. The configured common total length may be more than the maximum length. Thereafter, the gNB may calculate a difference between the configured common total length and the effective DL grant DCI length and a difference between the configured common total length and the effective UL grant DCI length.

The gNB may set a length of a dynamic length padding field in the DL grant DCI equal to the calculated difference between the configured common total length and the effective DL grant DCI length, such that the length of the DL grant DCI matches the configured common total length. Similarly, the gNB may set a length of a dynamic length padding field in the UL grant DCI equal to the calculated difference between the configured common total length and the effective UL grant DCI length, such that the length of the UL grant DCI matches the configured common total length. Accordingly, this approach allows both the DL grant DCI and the UL grant DCI to have non-zero length dynamic length padding fields.

In an aspect of the disclosure, when the gNB configures the grant DCI, the gNB may also include a configuration for the length of the dynamic length padding field. The configuration may be transmitted separately from the grant DCI. In an example, the configuration may be indicate the length of the padding field for both the DL grant DCI and the UL grant DCI (i.e. two dynamic configurations). Hence, the gNB may be responsible for matching the length of the DL grant DCI with the length of the UL grant DCI. The gNB may need to configure/reconfigure both the DL grant DCI and the UL grant DCI at the same time or their lengths may not match in the transient. The UE may treat a length mismatch between the DL grant DCI and the UL grant DCI as an error case. Otherwise, the UE may perform to two blind decodings per decoding candidate when the length of the DL grant DCI does not match the length of the UL grant DCI.

Figure 9:
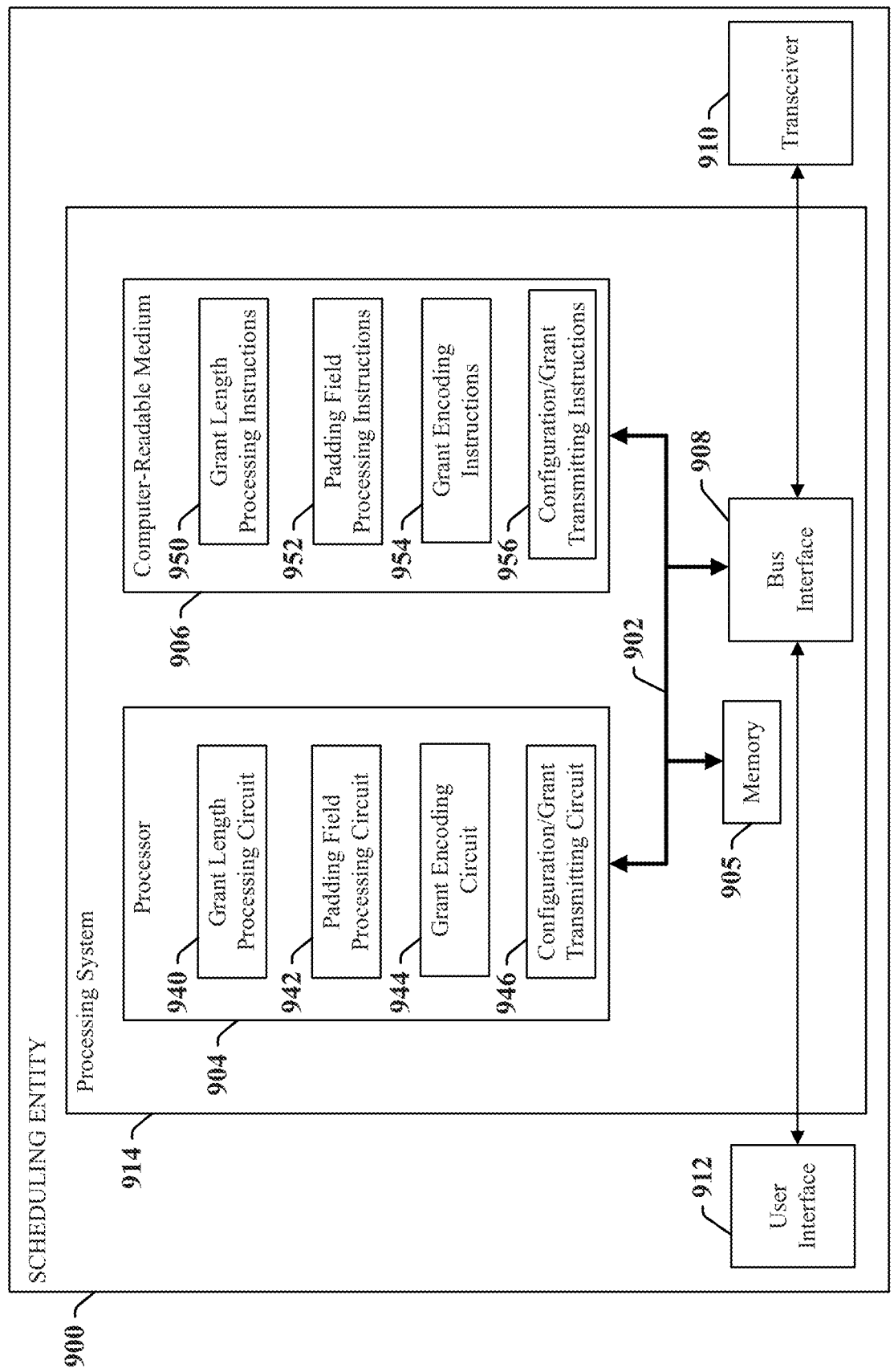
FIG. 9 illustrates an example of a hardware implementation for a scheduling entity adapted in accordance with certain aspects disclosed herein.

FIG. 9 is a conceptual diagram illustrating an example of a hardware implementation for a scheduling entity 900 employing a processing system 914. For example, the scheduling entity 900 may be a user equipment (UE) as illustrated in any one or more of FIG. 1 or 2, or referenced elsewhere herein. In another example, the scheduling entity 900 may be a base station as illustrated in any one or more of FIG. 1 or 2.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes and procedures described below and illustrated in FIG. 10.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided.

In some aspects of the disclosure, the processor 904 may include circuitry configured for various functions, including, for example, a grant length processing circuit 940 configured to detect a reference length based on an effective length of a downlink (DL) grant DCI and an effective length of an uplink (UL) grant DCI and calculate a length difference based on the effective DL grant DCI length and the effective UL grant DCI length, a padding field processing circuit 942 configured to set a length of a padding field in at least one of the DL grant DCI or the UL grant DCI equal to the calculated length difference such that the lengths of the DL grant DCI and UL grant DCI are both equal to the reference length and insert padding bits in the padding field of the at least one of the DL grant DCI or the UL grant DCI, a grant encoding circuit 944 configured to encode the at least one of the DL grant DCI or the UL grant DCI, and a configuration/grant transmitting circuit 946 configured to transmit at least one of the encoded DL grant DCI or the encoded UL grant DCI to a scheduled entity and/or transmit a configuration to the scheduled entity. For example, the circuitry may be configured to implement one or more of the functions described below, including in relation to FIG. 10.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 10:
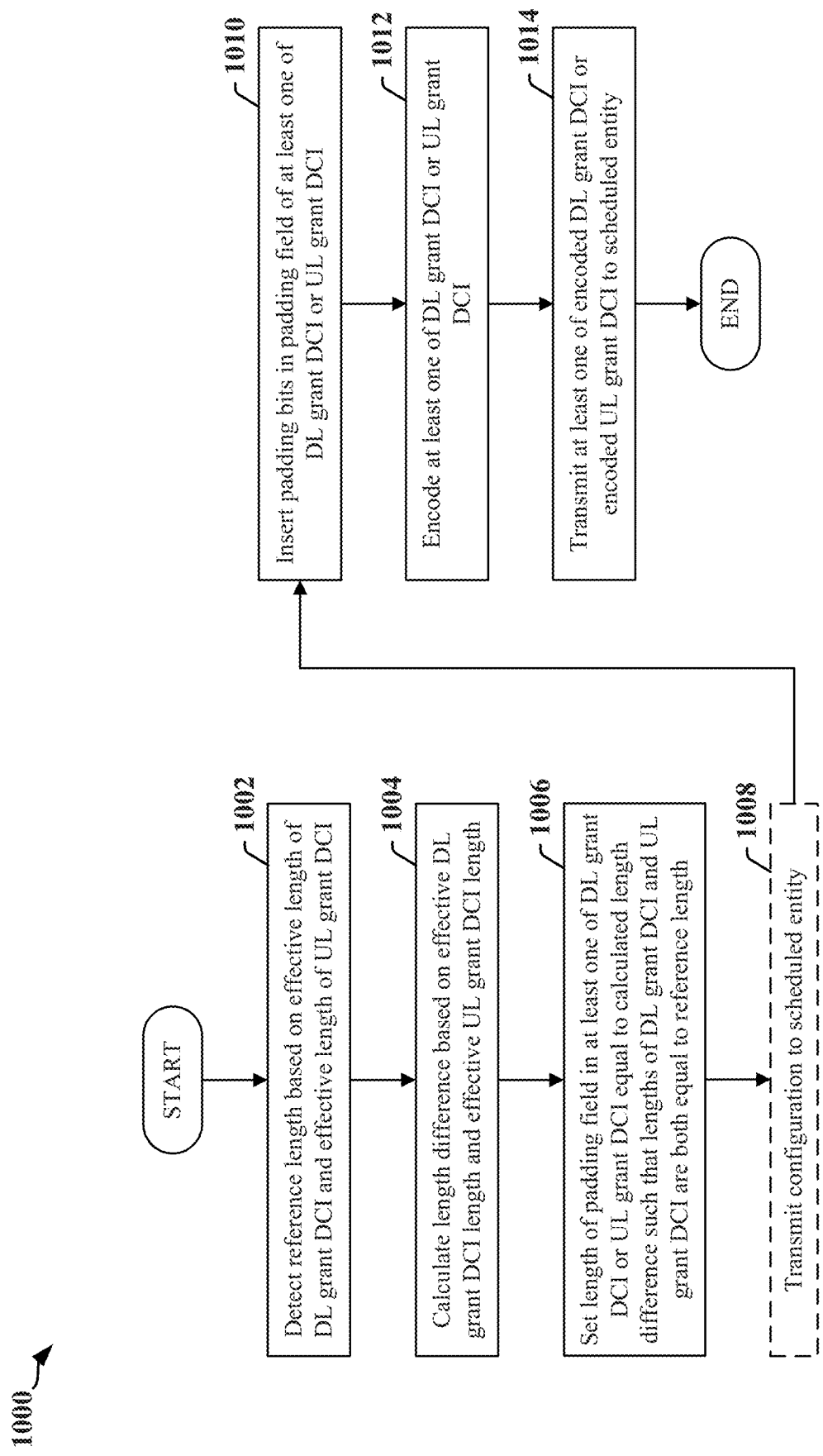
FIG. 10 is a flow chart illustrating a process in accordance with certain aspects disclosed herein.

In one or more examples, the computer-readable medium 906 may include software configured for various functions, including, for example, performing one or more of the functions associated with the process 1000 of FIG. 10. For example, the computer-readable medium 906 may include grant length processing instructions 950 for the grant length processing circuit 940, padding field processing instructions 952 for the padding field processing circuit 942, grant encoding instructions 954 for the grant encoding circuit 944, and configuration/grant transmitting instructions 956 for the configuration/grant transmitting circuit 946.

FIG. 10 is a flow chart illustrating a process 1000 in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 900 illustrated in FIG. 9. In some examples, the process 1000 may be carried out by any suitable apparatus or means for carrying out the functions or algorithm described below.

At block 1002, the scheduling entity configured to transmit downlink control information (DCI) carrying a downlink grant or an uplink grant may detect a reference length based on an effective length of a downlink (DL) grant DCI and an effective length of an uplink (UL) grant DCI.

At block 1004, the scheduling entity may calculate a length difference based on the effective DL grant DCI length and the effective UL grant DCI length.

At block 1006, the scheduling entity may set a length of a padding field in at least one of the DL grant DCI or the UL grant DCI equal to the calculated length difference such that the lengths of the DL grant DCI and UL grant DCI are both equal to the reference length.

At block 1008, the scheduling entity may optionally transmit a configuration to a scheduled entity. In some examples, the configuration may include a DL grant DCI format indicating the effective DL grant DCI length, a UL grant DCI format indicating the effective UL grant DCI length, and/or a common total length that is no shorter than both the effective DL grant DCI length and the effective UL grant DCI length.

At block 1010, the scheduling entity may insert padding bits in the padding field of the at least one of the DL grant DCI or the UL grant DCI. In one example, the padding bits inserted in the padding field are values of zero used for error detection. In another example, the padding bits inserted in the padding field are values for a cyclic redundancy check (CRC). The CRC may be a single CRC generation having a fixed length. Alternatively, the CRC may be one of a plurality of CRC generations having different lengths that corresponds to the length of the padding field.

At block 1012, the scheduling entity may encode the at least one of the DL grant DCI or the UL grant DCI.

At block 1014, the scheduling entity may transmit at least one of the encoded DL grant DCI or the encoded UL grant DCI to the scheduled entity.

In some examples, the detecting the reference length includes detecting a maximum length of the effective DL grant DCI length and the effective UL grant DCI length, the calculating the length difference includes calculating a difference between the effective DL grant DCI length and the effective UL grant DCI length, and the setting the length of the padding field includes setting the length of the padding field in a shorter one of the DL grant DCI and the UL grant DCI equal to the calculated difference such that the shorter one of the DL grant DCI and the UL grant DCI is lengthened to match the detected maximum length. Accordingly, the padding bits are inserted in the padding field of the shorter one of the DL grant DCI and the UL grant DCI that is lengthened to match the detected maximum length.

In other examples, the detecting the reference length includes configuring a common total length that is no shorter than both the effective DL grant DCI length and the effective UL grant DCI length and the calculating the length difference includes calculating a difference between the configured common total length and the effective DL grant DCI length and a difference between the configured common total length and the effective UL grant DCI length. Setting the length of the padding field includes setting the length of the padding field in the DL grant DCI equal to the calculated difference between the configured common total length and the effective DL grant DCI length such that the length of the DL grant DCI is lengthened to match the configured common total length, and setting the length of the padding field in the UL grant DCI equal to the calculated difference between the configured common total length and the effective UL grant DCI length such that the length of the UL grant DCI is lengthened to match the configured common total length. Accordingly, the padding bits are inserted in the padding field of the DL grant DCI that is lengthened to match the configured common total length and inserted in the padding field of the UL grant DCI that is lengthened to match the configured common total length.

In one configuration, an apparatus for transmitting downlink control information (DCI) carrying a downlink grant or an uplink grant may include means for detecting a reference length based on an effective length of a downlink (DL) grant DCI and an effective length of an uplink (UL) grant DCI, means for calculating a length difference based on the effective DL grant DCI length and the effective UL grant DCI length, means for setting a length of a padding field in at least one of the DL grant DCI or the UL grant DCI equal to the calculated length difference such that the lengths of the DL grant DCI and UL grant DCI are both equal to the reference length, means for transmitting a configuration to a scheduled entity; means for inserting padding bits in the padding field of the at least one of the DL grant DCI or the UL grant DCI, means for encoding the at least one of the DL grant DCI or the UL grant DCI, and means for transmitting at least one of the encoded DL grant DCI or the encoded UL grant DCI to the scheduled entity. In one aspect, the aforementioned means may be the processor 904 in which the invention resides from FIG. 9, having been configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable medium 906, or any other suitable apparatus or means described in any one of the drawings provided herein, and utilizing, for example, the processes and/or algorithms described herein in relation to FIG. 10.

Figure 11:
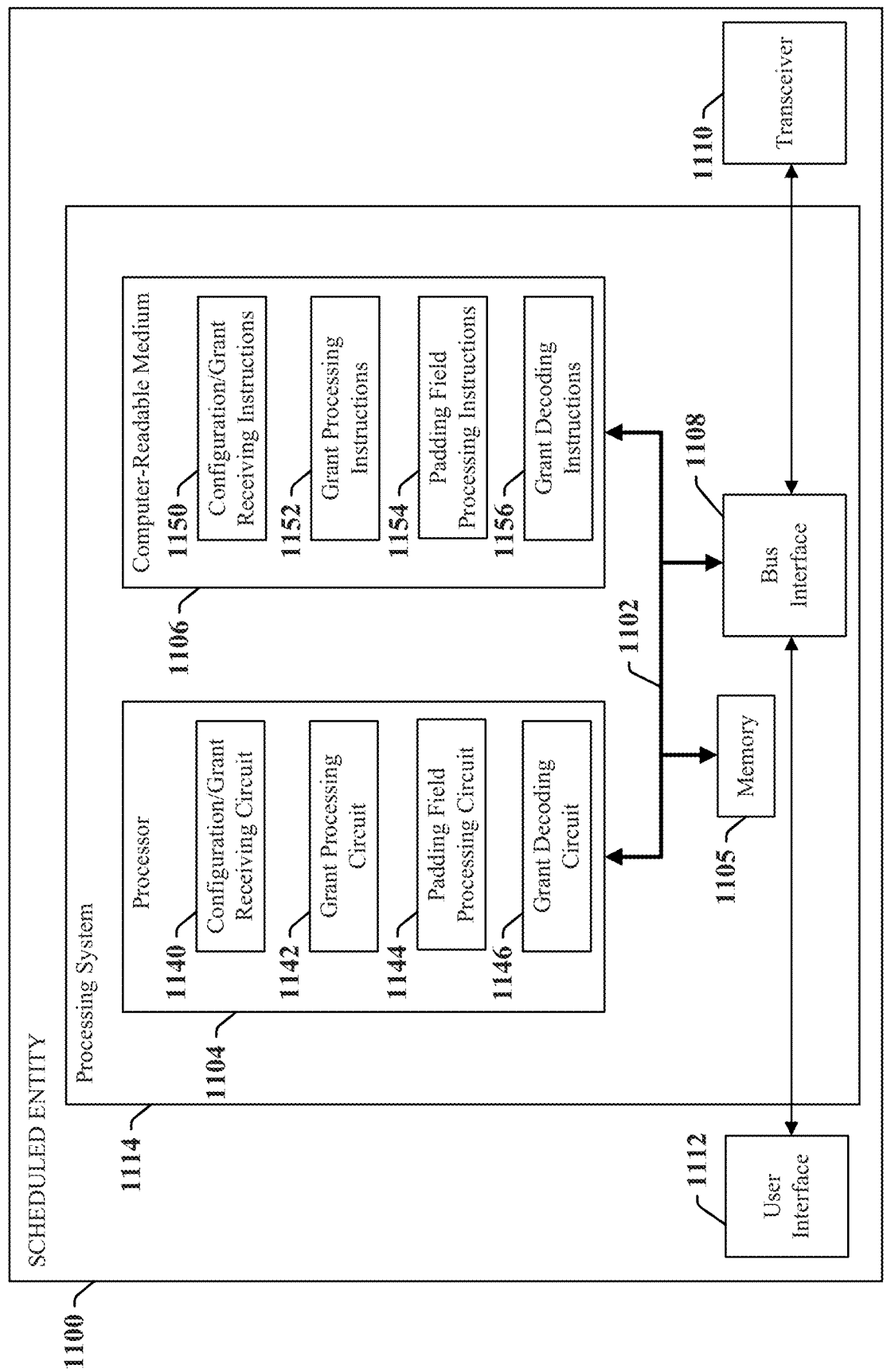
FIG. 11 illustrates an example of a hardware implementation for a scheduled entity in accordance with certain aspects disclosed herein.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIG. 1 or 2, or referenced elsewhere herein.

The processing system 1114 may be substantially the same as the processing system 914 illustrated in FIG. 9, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 9. That is, the processor 1104, as utilized in a scheduled entity 1100, may be used to implement any one or more of the processes described below and illustrated in FIG. 12.

In some aspects of the disclosure, the processor 1104 may include circuitry configured for various functions, including, for example, a configuration/grant receiving circuit 1140 configured to receive a configuration and a grant DCI from a scheduling entity, a grant processing circuit 1142 configured to detect a reference length of the grant DCI based on an effective length of a downlink (DL) grant DCI and an effective length of an uplink (UL) grant DCI and read a payload of the grant DCI based on the reference length to determine an identity of the grant DCI as the DL grant DCI or the UL grant DCI, a padding field processing circuit 1144 configured to detect if the grant DCI includes a padding field based on the identity of the grant DCI and the effective DL grant DCI length or the effective UL grant DCI length and calculate a length of the padding field if the grant DCI includes the padding field, and a grant decoding circuit 1146 configured to decode padding bits in the padding field according to the calculated padding field length to decode the grant DCI. For example, the circuitry may be configured to implement one or more of the functions described below, including in relation to FIG. 12.

Figure 12:
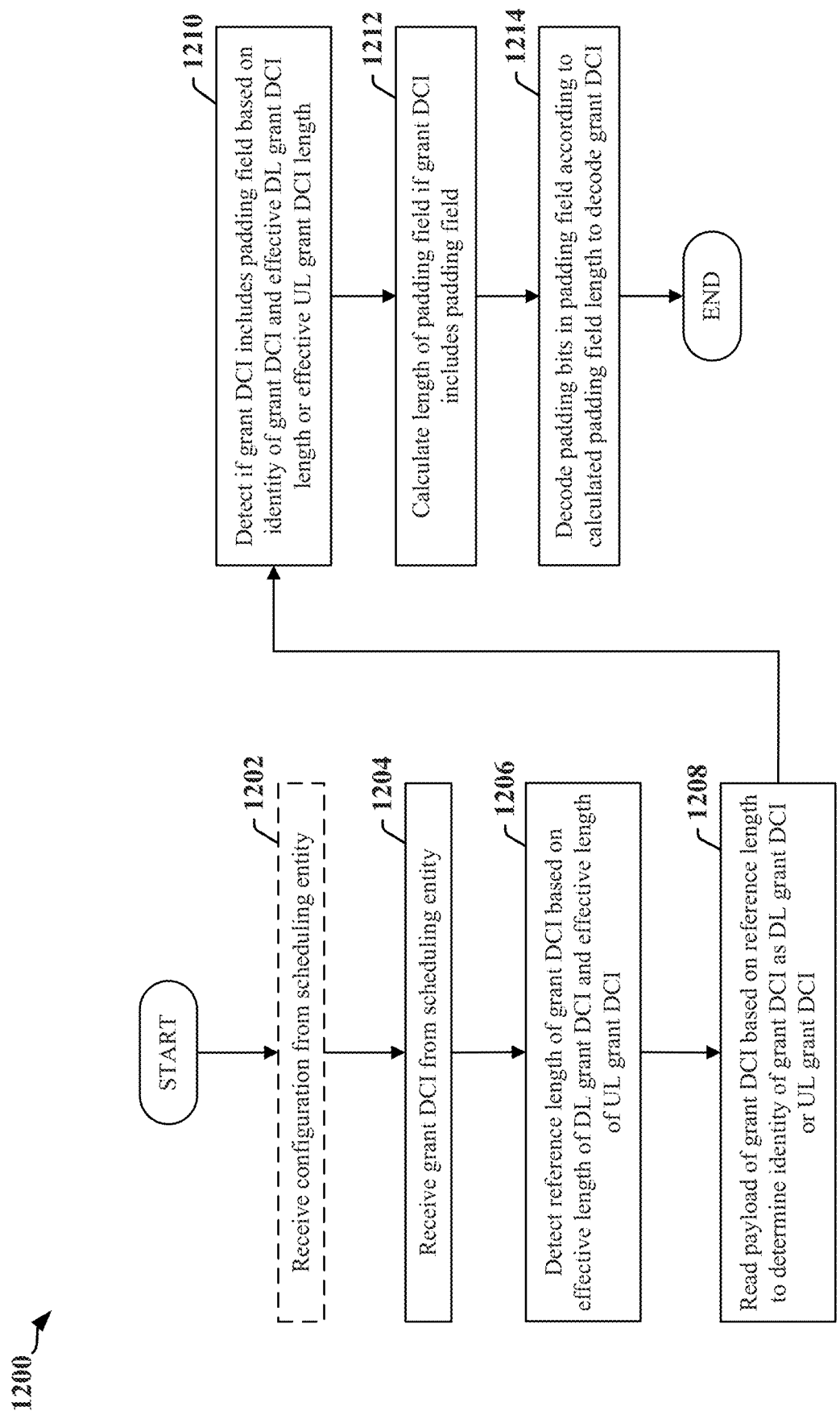
FIG. 12 is a flow chart illustrating a process in accordance with certain aspects disclosed herein.

In one or more examples, the computer-readable medium 1106 may include software configured for various functions, including, for example, performing one or more of the functions associated with the process 1200 of FIG. 12. For example, the computer-readable medium 1106 may include configuration/grant receiving instructions 1150 for the configuration/grant receiving circuit 1140, grant processing instructions 1152 for the grant processing circuit 1142, padding field processing instructions 1154 for the padding field processing circuit 1144, and grant decoding instructions 1156 for the grant decoding circuit 1146.

FIG. 12 is a flow chart illustrating a process 1200 in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 1100 illustrated in FIG. 11. In some examples, the process 1200 may be carried out by any suitable apparatus or means for carrying out the functions or algorithm described below.

At block 1202, the scheduled entity configured to decode downlink control information (DCI) carrying a downlink grant or an uplink grant may optionally receive a configuration from a scheduling entity. In some examples, the configuration may include a downlink (DL) grant DCI format indicating an effective length of a downlink (DL) grant DCI, an uplink (UL) grant DCI format indicating an effective length of an uplink (UL) grant DCI, and/or a common total length that is no shorter than both the effective DL grant DCI length and the effective UL grant DCI length.

At block 1204, the scheduled entity may receive the grant DCI from the scheduling entity.

At block 1206, the scheduled entity may detect a reference length of the grant DCI based on the effective DL grant DCI length and the effective UL grant DCI length.

At block 1208, the scheduled entity may read a payload of the grant DCI based on the reference length to determine an identity of the grant DCI as the DL grant DCI or the UL grant DCI.

At block 1210, the scheduled entity may detect if the grant DCI includes a padding field based on the identity of the grant DCI and the effective DL grant DCI length or the effective UL grant DCI length.

At block 1212, the scheduled entity may calculate a length of the padding field if the grant DCI includes the padding field.

At block 1214, the scheduled entity may decode padding bits in the padding field according to the calculated padding field length to decode the grant DCI. In one example, the decoded padding bits are values of zero used for error detection. In another example, the decoded padding bits are values for a cyclic redundancy check (CRC). The CRC may be a single CRC generation having a fixed length. Alternatively, the CRC may be one of a plurality of CRC generations having different lengths that corresponds to the length of the padding field.

In some examples, the calculating the length of the padding field includes calculating a length difference based on the effective DL grant DCI length and the effective UL grant DCI length, and calculating the length of the padding field in the grant DCI to be equal to the calculated length difference such that the length of the grant DCI is equal to the reference length.

In some examples, the detecting the reference length includes detecting a maximum length of the effective DL grant DCI length and the effective UL grant DCI length, and the calculating the length difference includes calculating a difference between the effective DL grant DCI length and the effective UL grant DCI length. Accordingly, the detecting if the grant DCI includes the padding field includes comparing the maximum length to the effective DL grant DCI length when the identity of the grant DCI is the DL grant DCI and detecting that the grant DCI includes the padding field when the effective DL grant DCI length does not match the maximum length, and comparing the maximum length to the effective UL grant DCI length when the identity of the grant DCI is the UL grant DCI and detecting that the grant DCI includes the padding field when the effective UL grant DCI length does not match the maximum length.

In other examples, the detecting the reference length includes configuring a common total length that is no shorter than both the effective DL grant DCI length and the effective UL grant DCI length, and the calculating the length difference includes calculating a difference between the configured common total length and the effective DL grant DCI length and a difference between the configured common total length and the effective UL grant DCI length. Accordingly, the detecting if the grant DCI includes the padding field includes comparing the common total length to the effective DL grant DCI length when the identity of the grant DCI is the DL grant DCI and detecting that the grant DCI includes the padding field when the effective DL grant DCI length does not match the common total length, and comparing the common total length to the effective UL grant DCI length when the identity of the grant DCI is the UL grant DCI and detecting that the grant DCI includes the padding field when the effective UL grant DCI length does not match the common total length.

In one configuration, an apparatus for decoding downlink control information (DCI) may include means for receiving a configuration from a scheduling entity, means for receiving the grant DCI from the scheduling entity, means for detecting a reference length of the grant DCI based on an effective length of a downlink (DL) grant DCI and an effective length of an uplink (UL) grant DCI, means for reading a payload of the grant DCI based on the reference length to determine an identity of the grant DCI as the DL grant DCI or the UL grant DCI, means for detecting if the grant DCI includes a padding field based on the identity of the grant DCI and the effective DL grant DCI length or the effective UL grant DCI length, means for calculating a length of the padding field if the grant DCI includes the padding field, and means for decoding padding bits in the padding field according to the calculated padding field length to decode the grant DCI. In one aspect, the aforementioned means may be the processor 1104 in which the invention resides from FIG. 11, having been configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable medium 1106, or any other suitable apparatus or means described in any one of the drawings provided herein, and utilizing, for example, the processes and/or algorithms described herein in relation to FIG. 12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for transmitting downlink control information (DCI) carrying a downlink grant or an uplink grant, comprising:
    detecting a reference length based on an effective length of a downlink (DL) grant DCI and an effective length of an uplink (UL) grant DCI;
    calculating a length difference based on the effective DL grant DCI length and the effective UL grant DCI length;
    setting a length of a padding field in at least one of the DL grant DCI or the UL grant DCI equal to the calculated length difference such that the lengths of the DL grant and UL grant DCI are both equal to the reference length;
    inserting padding bits in the padding field of the at least one of the DL grant DCI or the UL grant DCI;
    encoding the at least one of the DL grant DCI or the UL grant DCI; and
    transmitting at least one of the encoded DL grant DCI or the encoded UL grant DCI to a scheduled entity.

2. The method of claim 1, wherein:
    the detecting the reference length includes detecting a maximum length of the effective DL grant DCI length and the effective UL grant DCI length;
    the calculating the length difference includes calculating a difference between the effective DL grant DCI length and the effective UL grant DCI length;
    the setting the length of the padding field includes setting the length of the padding field in a shorter one of the DL grant DCI and the UL grant DCI equal to the calculated difference such that the shorter one of the DL grant DCI and the UL grant DCI is lengthened to match the detected maximum length; and
    the padding bits are inserted in the padding field of the shorter one of the DL grant DCI and the UL grant DCI that is lengthened to match the detected maximum length.

3. The method of claim 1, wherein:
    detecting the reference length includes configuring a common total length that is no shorter than both the effective DL grant DCI length and the effective UL grant DCI length;
    the calculating the length difference includes calculating a difference between the configured common total length and the effective DL grant DCI length and a difference between the configured common total length and the effective UL grant DCI length;
    the setting the length of the padding field includes:
        setting the length of the padding field in the DL grant DCI equal to the calculated difference between the configured common total length and the effective DL grant DCI length such that the length of the DL grant DCI is lengthened to match the configured common total length, and
        setting the length of the padding field in the UL grant DCI equal to the calculated difference between the configured common total length and the effective UL grant DCI length such that the length of the UL grant DCI is lengthened to match the configured common total length; and
    the padding bits are inserted in the padding field of the DL grant DCI that is lengthened to match the configured common total length and inserted in the padding field of the UL grant DCI that is lengthened to match the configured common total length.

4. The method of claim 1, wherein the padding bits inserted in the padding field are values of zero used for error detection.

5. The method of claim 1, wherein the padding bits inserted in the padding field are values for a cyclic redundancy check (CRC).

6. The method of claim 5, wherein the CRC is a single CRC generation having a fixed length.

7. The method of claim 5, wherein the CRC is one of a plurality of CRC generations having different lengths that corresponds to the length of the padding field.

8. The method of claim 1, further including transmitting a configuration to the scheduled entity, the configuration including at least one of:
    a DL grant DCI format indicating the effective DL grant DCI length;
    a UL grant DCI format indicating the effective UL grant DCI length; or
    a common total length that is no shorter than both the effective DL grant DCI length and the effective UL grant DCI length.

9. An apparatus for transmitting downlink control information (DCI) carrying a downlink grant or an uplink grant, comprising:
    means for detecting a reference length based on an effective length of a downlink (DL) grant DCI and an effective length of an uplink (UL) grant DCI;
    means for calculating a length difference based on the effective DL grant DCI length an the effective UL grant DCI length;
    means for setting a length of a padding field in at least one of the DL grant DCI or the UL grant DCI equal to the calculated length difference such that the lengths of the DL grant DCI and UL grant DCI are both equal to the reference length;
    means for inserting padding bits in the padding field of the at least one of the DL grant DCI or the UL grant DCI;
    means for encoding the at least one of the DL grant DCI or the UL grant DCI; and means for transmitting at least one of the encoded DL grant DCI or the encoded UL grant DCI to a scheduled entity.

10. The apparatus of claim 9, wherein:
the means for detecting the reference length is configured to detect a maximum length of the effective DL grant DCI length and the effective UL grant DCI length;
the means for calculating the length difference is configured to calculate a difference between the effective DL grant DCI length and the effective UL grant DCI length;
the means for setting the length of the padding field is configured to set the length of the padding field in a shorter one of the DL grant DCI and the UL grant DCI equal to the calculated difference such that the shorter one of the DL grant DCI and the UL grant DCI is lengthened to match the detected maximum length; and
the padding bits are inserted in the padding field of the shorter one of the DL grant DCI and the UL grant DCI that is lengthened to match the detected maximum length.

11. The apparatus of claim 9, wherein:
the means for detecting the reference length is configured to configure a common total length that is no shorter than both the effective DL grant DCI and the effective UL grant DCI length;
the means for calculating the length difference is configured to calculate a difference between the configured common total length and the effective DL grant DCI length and a difference between the configured common total length and the effective UL grant DCI length;
the means for setting the length of the padding field is configured to:
set the length of the padding field in the DL grant DCI equal to the calculated difference between the configured common total length and the effective DL grant DCI length such that the length of the DL grant DCI is lengthened to match the configured common total length, and
set the length of the padding field in the UL grant DCI equal to the calculated difference between the configured common total length and the effective UL grant DCI length such that the length of the UL grant DCI is lengthened to match the configured common total length; and
the padding bits are inserted in the padding field of the DL grant DCI that is lengthened to match the configured common total length and inserted in the padding field of the UL grant DCI that is lengthened to match the configured common total length.

12. The apparatus of claim 9, wherein the padding bits inserted in the padding field are:
values of zero used for error detection; or
values for a cyclic redundancy check (CRC).

13. The apparatus of claim 9, further including means for transmitting a configuration to the scheduled entity, the configuration including at least one of:
a DL grant DCI format indicating the effective DL grant DCI length;
a UL grant DCI format indicating the effective UL grant DCI length; or
a common total length that is no shorter than both the effective DL grant DCI length and the effective UL grant DCI length.

14. A method for decoding grant downlink control information (DCI) carrying a downlink grant or an uplink grant, comprising:

receiving the grant DCI from a scheduling entity;
detecting a reference length of the grant DCI based on an effective length of a downlink (DL) grant DCI and an effective length of an uplink (UL) grant DCI;
reading a payload of the grant DCI based on the reference length to determine an identity of the grant DCI as the DL grant DCI or the UL grant DCI;
detecting if the grant DCI includes a padding field based on the identity of the grant DCI and the effective DL grant DCI length or the effective UL grant DCI length;
calculating a length of the padding field if the grant DCI includes the padding field; and
decoding padding bits in the padding field according to the calculated padding field length to decode the grant DCI.

15. The method of claim 14, wherein the calculating the length of the padding field includes:
calculating aa length difference based on the effective DL grant DCI length and the effective UL grant DCI length; and
calculating the length of the padding field in the grant DCI to be equal to the calculated length difference such that the length of the grant DCI is equal to the reference length.

16. The method of claim 15, wherein:
the detecting the reference length includes detecting a maximum length of the effective DL grant DCI length and the effective UL grant DCI length; and
the calculating the length difference includes calculating a difference between the effective DL grant DCI length and the effective UL grant DCI length.

17. The method of claim 16, wherein the detecting if the grant DCI includes the padding field includes:
comparing the maximum length to the effective DL grant DCI length when the identity of the grant DCI is the DL grant DCI and detecting that the grant DCI includes the padding field when the effective DL grant DCI length does not match the maximum length; and
comparing the maximum length to the effective UL grant DCI length when the identity of the grant DCI is the UL grant UCI and detecting that the grant DCI includes the padding field when the effective UL grant DCI length does not match the maximum length.

18. The method of claim 15, wherein:
the detecting the reference length includes configuring a common total length that is no shorter than both the effective DL grant DCI length and the effective UL grant DCI length; and
the calculating the length difference includes calculating a difference between the configured common total length and the effective DL grant DCI length and a difference between the configured common total length and the effective UL grant DCI length.

19. The method of claim 18, wherein the detecting if the grant DCI includes the padding field includes:
comparing the common total length to the effective DL grant DCI length when the identity of the grant DCI is the DL grant DCI and detecting that the grant DCI includes the padding field when the effective DL grant DCI length does not match the common total length; and
comparing the common total length to the effective UL grant DCI length when the identity of the grant DCI is the UL grant DCI and detecting that the grant DCI includes the padding field when the effective UL grant DCI length does not match the common total length.

20. The method of claim 14, wherein the decoded padding bits are:
values of zero used for error detection; or
values for a cyclic redundancy check (CRC).

21. The method of claim 20, wherein the CRC is:
a single CRC generation having a fixed length; or
one of a plurality of CRC generations having different lengths that corresponds to the length of the padding field.

22. The method of claim 14, further including receiving a configuration from the scheduling entity, the configuration including at least one of:
a DL grant DCI format indicating the effective DL grant DCI length;
a UL grant DCI format indicating the effective UL grant DCI length or
a common total length that is no shorter than both the effective DL grant DCI length and the effective UL grant DCI length.

23. An apparatus for decoding grant downlink control information (DCI) carrying a downlink grant or an uplink grant, comprising:
means for receiving the grant DCI from a scheduling entity;
means for detecting a reference length of the grant DCI based on an effective length of a downlink (DL) grant DCI and an effective length of an uplink (UL) grant DCI;
means for reading a payload of the grant DCI based on the reference length to determine an identity of the grant DCI as the DL grant DCI or the UL grant DCI;
means for detecting if the grant DCI includes a padding field based on the identity of the grant DCI and the effective DL grant DCI length or the effective UL grant DCI length;
means for calculating a length of the padding field if the grant DCI includes the padding field; and
means for decoding padding bits in the padding field according to the calculated padding field length to decode the grant DCI.

24. The apparatus of claim 23, wherein the means for calculating the length of the padding field is configured to:
calculate a length difference based on the effective DL grant DCI length and the effective UL grant DCI length; and
calculate the length of the padding field in the grant DCI to be equal to the calculated length difference such that the length of the grant DCI is equal to the reference length.

25. The apparatus of claim 24, wherein:
means for detecting the reference length is configured to detect a maximum length of the effective DL grant DCI length and the effective UL grant DCI length; and
the means for calculating the length difference is configured to calculate a difference between the effective DL grant DCI length and the effective UL grant DCI length.

26. The apparatus of claim 25, wherein the means for detecting if the grant DCI includes the padding field is configured to:
compare the maximum length to the effective UL grant DCI length when the identity of the grant DCI is the UL grant DCI and detect that the grant DCI includes the padding field when the effective DL grant DCI length does not match the maximum length; and
compare the maximum length to the effective UL grant DCI length when the identity of the grant DCI is the UL grant DCI and detect that the grant DCI includes the padding field when the effective UL grant DCI length does not match the maximum length.

27. The apparatus of claim 24, wherein:
the means for detecting the reference length is configured to configure a common total length that is no shorter than both the effective DL grant DCI length and the effective UL grant DCI length; and
the means for calculating the length difference is configured to calculate a difference between the configured common total length and the effective DL grant DCI length and a difference between the configured common total length and the effective UL grant DCI length.

28. The apparatus of claim 27, wherein the means for detecting if the grant DCI includes the padding field is configured to:
compare the common total length to the effective DL grant DCI length when the identity of the grant DCI is the DL grant DCI and detect that the grant DCI includes the padding field when the effective DL grant DCI length does not match the common total length; and
compare the common total length to the effective UL grant DCI length when the identity of the grant DCI is the UL grant DCI and detect that the grant DCI includes the padding field when the effective UL grant DCI length does not match the common total length.

29. The apparatus of claim 23, wherein the decoded padding bits are:
values of zero used for error detection; or
values for a cyclic redundancy check (CRC).

30. The apparatus of claim 23, further including means for receiving a configuration from the scheduling entity, the configuration including at least one of:
a DL grant DCI format indicating the effective DL grant DCI length;
a UL grant DCI format indicating the effective UL grant DCI length; or
a common total length that is no shorter than both the effective DL grant DCI length and the effective UL grant DCI length.

31. An apparatus for transmitting downlink control information (DCI) carrying a downlink grant or an uplink grant, comprising:
at least one processor;
a transceiver communicatively coupled to the at least one processor; and
a memory communicatively coupled to the at least one processor, wherein the memory and the at least one processor are configured to:
detect a reference length based on an effective length of a downlink (DL) grant DCI and an effective length of an uplink (UL) grant DCI,
calculate a length difference based on the effective DL grant DCI length and the effective UL grant DCI length,
set a length of a padding field in at least one of the DL grant DCI or the UL grant DCI equal to the calculated length difference such that the lengths of the DL grant DCI and UL grant DCI are both equal to the reference length,
insert padding bits in the padding field of the at least one of the DL grant DCI or the UL grant DCI,
encode the at least one of the DL grant DCI or the UL grant DCI, and
transmit at least one of the encoded DL grant DCI or the encoded UL grant DCI to a scheduled entity.

32. The apparatus of claim 31, wherein:
the memory and the at least one processor configured to detect the reference length are configured to detect a maximum length of the effective DL grant DCI length and the effective UL grant DCI length;
the memory and the at least one processor configured to calculate the length difference are configured to calculate a difference between the effective DL grant DCI length and the effective UL grant DCI length;
the memory and the at least one processor configured to set the length of the padding field are configured to set the length of the padding field in a shorter one of the DL grant DCI and the UL grant DCI equal to the calculated difference such that the shorter one of the DL grant DCI and the UL grant DCI is lengthened to match the detected maximum length; and the memory and the at least one processor configured to insert the padding bits are configured to insert the padding bits in the padding field of the shorter one of the DL grant DCI and the UL grant DCI that is lengthened to match the detected maximum length.

33. The apparatus of claim 31, wherein:
the memory and the at least one processor configured to detect the reference length are configured to configure a common total length that is no shorter than both the effective DL grant DCI length and the effective UL grant DCI length;
the memory and the at least one processor configured to calculate the length difference are configured to calculate a difference between the configured common total length and the effective DL grant DCI length and a difference between the configured common total length and the effective UL grant DCI length;
the memory and the at least one processor configured to set the length of the padding field are configured to:
set the length of the padding field in the DL grant DCI equal to the calculated difference between the configured common total length and the effective DL grant DCI length such that the length of the DL grant DCI is lengthened to match the configured common total length, and
set the length of the padding field in the UL grant DCI equal to the calculated difference between the configured common total length and the effective UL grant DCI length such that the length of the UL grant DCI is lengthened to match the configured common total length; and
the memory and the at least one processor configured to insert the padding bits are configured to insert the padding bits in the padding field of the DL grant DCI that is lengthened to match the configured common total length and insert the padding bits in the padding field of the UL grant DCI that is lengthened to match the configured common total length.

34. The apparatus of claim 31, wherein the padding bits inserted in the padding field are values of zero used for error detection.

35. The apparatus of claim 31, wherein the padding bits inserted in the padding field are values for a cyclic redundancy check (CRC).

36. The apparatus of claim 35, wherein the CRC is a single CRC generation having a fixed length.

37. The apparatus of claim 35, wherein the CRC is one of a plurality of CRC generations having different lengths that corresponds to the length of the padding field.

38. The apparatus of claim 31, wherein the memory and the at least one processor are further configured to transmit a configuration to the scheduled entity, the configuration including at least one of:
a DL grant DCI format indicating the effective DL grant DCI length;
a UL grant DCI format indicating the effective UL grant DCI length; or
a common total length that is no shorter than both the effective DL grant DCI length and the effective UL grant DCI length.

39. An article of manufacture for use by a wireless communication device in a wireless communication network for transmitting downlink control information (DCI) carrying a downlink grant or an uplink grant, the article comprising:
a non-transitory computer-readable medium having stored therein instructions executable by one or more processors of the wireless communication device to:
detect a reference length based on an effective length of a downlink (DL) grant DCI and an effective length of an uplink (UL) grant DCI,
calculate a length difference based on the effective DL grant DCI length and the effective UL grant DCI length,
set a length of a padding field in at least one of the DL grant DCI or the UL grant DCI equal to the calculated length difference such that the lengths of the DL grant DCI and UL grant DCI are both equal to the reference length,
insert padding bits in the padding field of the at least one of the DL grant DCI or the UL grant DCI,
encode the at least one of the DL grant DCI or the UL grant DCI, and
transmit at least one of the encoded DL grant DCI or the encoded UL grant DCI to a scheduled entity.

40. The non-transitory computer-readable medium of claim 39, wherein:
the instructions to detect the reference length are configured to detect a maximum length of the effective DL grant DCI length and the effective UL grant DCI length;
the instructions to calculate the length difference are configured to calculate a difference between the effective DL grant DCI length and the effective UL grant DCI length;
the instructions to set the length of the padding field are configured to set the length of the padding field in a shorter one of the DL grant DCI and the UL grant DCI equal to the calculated difference such that the shorter one of the DL grant DCI and the UL grant DCI is lengthened to match the detected maximum length; and
the instructions to insert the padding bits are configured to insert the padding bits in the padding field of the shorter one of the DL grant DCI and the UL grant DCI that is lengthened to match the detected maximum length.

41. The non-transitory computer-readable medium of claim 39, wherein:
the instructions to detect the reference length are configured to configure a common total length that is no shorter than both the effective DL grant DCI length and the effective UL grant DCI length;
the instructions to calculate the length difference are configured to calculate a difference between the configured common total length and the effective DL grant DCI length and a difference between the configured common total length and the effective UL grant DCI length;

the instructions to set the length of the padding field are configured to:

set the length of the padding field in the DL grant DCI equal to the calculated difference between the configured common total length and the effective DL grant DCI length such that the length of the DL grant DCI is lengthened to match the configured common total length, and set the length of the padding field in the UL grant DCI equal to the calculated difference between the configured common total length and the effective UL grant DCI length such that the length of the UL grant DCI is lengthened to match the configured common total length; and the instructions to insert the padding bits are configured to insert the padding bits in the padding field of the DL grant DCI that is lengthened to match the configured common total length and insert the padding bits in the padding field of the UL grant DCI that is lengthened to match the configured common total length.

42. The non-transitory computer-readable medium of claim 39, wherein the padding bits inserted in the padding field are:

values of zero used for error detection; or values for a cyclic redundancy check (CRC).

43. The non-transitory computer-readable medium of claim 39, further having stored therein instructions executable by one or more processors of the wireless communication device to transmit a configuration to the scheduled entity, the configuration including at least one of:

a DL grant DCI format indicating the effective DL grant DCI length;

a UL grant DCI format indicating the effective UL grant DCI length; or a common total length that is no shorter than both the effective DL grant DCI length and the effective UL grant DCI length.

44. An apparatus for decoding grant downlink control information (DCI) carrying a downlink grant or an uplink grant, comprising:

at least one processor;

a transceiver communicatively coupled to the at least one processor; and a memory communicatively coupled to the at least one processor, wherein the memory and the at least one processor are configured to:

receive the grant DCI from a scheduling entity, detect a reference length of the grant DCI based on an effective length of a downlink (DL) grant DCI and an effective length of an uplink (UL) grant DCI, read a payload of the grant DCI based on the reference length to determine an identity of the grant DCI as the DL grant DCI or the UL grant DCI, detect if the grant DCI includes a padding field based on the identity of the grant DCI and the effective DL grant DCI length or the effective UL grant DCI length, calculate a length of the padding field if the grant DCI includes the padding field, and decode padding bits in the padding field according to the calculated padding field length to decode the grant DCI.

45. The apparatus of claim 44, wherein the memory and the at least one processor configured to calculate the length of the padding field are configured to:

calculate a length difference based on the effective DL grant DCI length and the effective UL grant DCI length; and calculate the length of the padding field in the grant DCI to be equal to the calculated length difference such that the length of the grant DCI is equal to the reference length.

46. The apparatus of claim 45, wherein:

the memory and the at least one processor configured to detect the reference length are configured to detect a maximum length of the effective DL grant DCI length and the effective UL grant DCI length; and the memory and the at least one processor configured to calculate the length difference are configured to calculate a difference between the effective DL grant DCI length and the effective UL grant DCI length.

47. The apparatus of claim 46, wherein the memory and the at least one processor configured to detect if the grant DCI includes the padding field are configured to:

compare the maximum length to the effective DL grant DCI length when the identity of the grant DCI is the DL grant DCI and detect that the grant DCI includes the padding field when the effective DL grant DCI length does not match the maximum length; and compare the maximum length to the effective UL grant DCI length when the identity of the grant DCI is the UL grant DCI and detect that the grant DCI includes the padding field when the effective UL grant DCI length does not match the maximum length.

48. The apparatus of claim 45, wherein:

the memory and the at least one processor configured to detect the reference length are configured to configure a common total length that is no shorter than both the effective DL grant DCI length and the effective UL grant DCI length; and the memory and the at least one processor configured to calculate the length difference are configured to calculate a difference between the configured common total length and the effective DL grant DCI length and a difference between the configured common total length and the effective UL grant DCI length.

49. The apparatus of claim 48, wherein the memory and the at least one processor configured to detect if the grant DCI includes the padding field are configured to:

compare the common total length to the effective DL grant DCI length when the identity of the grant DCI is the DL grant DCI and detect that the grant DCI includes the padding field when the effective DL grant DCI length does not match the common total length; and compare the common total length to the effective UL grant DCI length when the identity of the grant DCI is the UL grant DCI and detect that the grant DCI includes the padding field when the effective UL grant DCI length does not match the common total length.

50. The apparatus of claim 44, wherein the decoded padding bits are:

values of zero used for error detection; or values for a cyclic redundancy check (CRC).

51. The apparatus of claim 50, wherein the CRC is:

a single CRC generation having a fixed length; or one of a plurality of CRC generations having different lengths that corresponds to the length of the padding field.

52. The apparatus of claim 44, wherein the memory and the at least one processor are further configured to receive a configuration from the scheduling entity, the configuration including at least one of:
- a DL grant DCI format indicating the effective DL grant DCI length;
- a UL grant DCI format indicating the effective UL grant DCI length; or
- a common total length that is no shorter than both the effective DL grant DCI length and the effective UL grant DCI length.

53. An article of manufacture for use by a wireless communication device in a wireless communication network for decoding grant downlink control information (DCI) carrying a downlink grant or an uplink grant, the article comprising:
- a non-transitory computer-readable medium having stored therein instructions executable by one or more processors of the wireless communication device to:
  - receive the grant DCI from a scheduling entity,
  - detect a reference length of the grant DCI based on an effective length of a downlink (DL) grant DCI and an effective length of an uplink (UL) grant DCI,
  - read a payload of the grant DCI based on the reference length to determine an identity of the grant DCI as the DL grant DCI or the UL grant DCI,
  - detect if the grant DCI includes a padding field based on the identity of the grant DCI and the effective DL grant DCI length or the effective UL grant DCI length,
  - calculate a length of the padding field if the grant DCI includes the padding field, and
  - decode padding bits in the padding field according to the calculated padding field length to decode the grant DCI.

54. The non-transitory computer-readable medium of claim 53, wherein the instructions to calculate the length of the padding field are configured to:
- calculate a length difference based on the effective DL grant DCI length and the effective UL grant DCI length; and
- calculate the length of the padding field in the grant DCI to be equal to the calculated length difference such that the length of the grant DCI is equal to the reference length.

55. The non-transitory computer-readable medium of claim 54, wherein:
- the instructions to detect the reference length are configured to detect a maximum length of the effective DL grant DCI length and the effective UL grant DCI length; and
- the instructions to calculate the length difference are configured to calculate a difference between the effective DL grant DCI length and the effective UL grant DCI length.

56. The non-transitory computer-readable medium of claim 55, wherein the instructions to detect if the grant DCI includes the padding field are configured to:
- compare the maximum length to the effective DL grant DCI length when the identity of the grant DCI is the DL grant DCI and detect that the grant DCI includes the padding field when the effective DL grant DCI length does not match the maximum length; and
- compare the maximum length to the effective UL grant DCI length when the identity of the grant DCI is the UL grant DCI and detect that the grant DCI includes the padding field when the effective UL grant DCI length does not match the maximum length.

57. The non-transitory computer-readable medium of claim 54, wherein:
- the instructions to detect the reference length are configured to configure a common total length that is no shorter than both the effective DL grant DCI length and the effective UL grant DCI length; and
- the instructions to calculate the length difference are configured to calculate a difference between the configured common total length and the effective DL grant DCI length and a difference between the configured common total length and the effective UL grant DCI length.

58. The non-transitory computer-readable medium of claim 57, wherein the instructions to detect if the grant DCI includes the padding field are configured to:
- compare the common total length to the effective DL grant DCI length when the identity of the grant DCI is the DL grant DCI and detect that the grant DCI includes the padding field when the effective DL grant DCI length does not match the common total length; and
- compare the common total length to the effective UL grant DCI length when the identity of the grant DCI is the UL grant DCI and detect that the grant DCI includes the padding field when the effective UL grant DCI length does not match the common total length.

59. The non-transitory computer-readable medium of claim 53, wherein the decoded padding bits are:
- values of zero used for error detection; or
- values for a cyclic redundancy check (CRC).

60. The non-transitory computer-readable medium of claim 54, further having stored therein instructions executable by one or more processors of the wireless communication device to receive a configuration from the scheduling entity, the configuration including at least one of:
- a DL grant DCI format indicating the effective DL grant DCI length;
- a UL grant DCI format indicating the effective UL grant DCI length; or
- a common total length that is no shorter than both the effective DL grant DCI length and the effective UL grant DCI length.

* * * * *